(12) United States Patent
Wu et al.

(10) Patent No.: US 12,032,137 B2
(45) Date of Patent: Jul. 9, 2024

(54) OPTICAL IMAGING LENS ASSEMBLY

(71) Applicant: ZHEJIANG SUNNY OPTICS CO., LTD., Zhejiang (CN)

(72) Inventors: Qi Wu, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 595 days.

(21) Appl. No.: 17/331,701

(22) Filed: May 27, 2021

(65) Prior Publication Data
US 2022/0026682 A1    Jan. 27, 2022

(30) Foreign Application Priority Data

Jul. 21, 2020   (CN) .......................... 202010703192.8

(51) Int. Cl.
*G02B 13/00* (2006.01)
*G02B 9/60* (2006.01)
*G02B 27/00* (2006.01)

(52) U.S. Cl.
CPC .......... *G02B 13/0045* (2013.01); *G02B 9/60* (2013.01); *G02B 27/0025* (2013.01)

(58) Field of Classification Search
CPC ... G02B 13/0045; G02B 9/60; G02B 27/0025
USPC .................................................. 359/700, 714
See application file for complete search history.

(56) References Cited

U.S. PATENT DOCUMENTS

| 8,508,860 | B2 | 8/2013 | Tang et al. | |
|---|---|---|---|---|
| 2012/0087020 | A1* | 4/2012 | Tang | G02B 13/0045 359/714 |
| 2012/0287513 | A1* | 11/2012 | Hsu | G02B 9/60 359/714 |
| 2012/0300315 | A1* | 11/2012 | Chen | G02B 13/0045 359/714 |
| 2013/0002931 | A1* | 1/2013 | Tsai | G02B 13/0045 348/340 |
| 2013/0010374 | A1* | 1/2013 | Hsieh | G02B 13/18 359/714 |
| 2013/0021680 | A1* | 1/2013 | Chen | G02B 13/0045 359/714 |

(Continued)

OTHER PUBLICATIONS

1 The first office action of patent family IN application No. 202114023830 issued on Mar. 4, 2022.

*Primary Examiner* — Sharrief I Broome
(74) *Attorney, Agent, or Firm* — Samson G. Yu

(57) ABSTRACT

The disclosure provides an optical imaging lens assembly, which sequentially includes from an object side to an image side along an optical axis: a first lens having a positive refractive power; a second lens having a negative refractive power; a third lens having a refractive power; a fourth lens having a refractive power and an image-side surface of the fourth lens being a concave surface; and a fifth lens having a refractive power. ImgH, half of a diagonal length of an effective pixel region on an imaging surface of the optical imaging lens assembly, TTL, a distance from an object-side surface of the first lens to the imaging surface on the optical axis, and f, a total effective focal length of the optical imaging lens assembly satisfy: ImgH/(TTL/f)>45 mm, which makes the optical imaging lens assembly have the features of long focus, a large image surface, etc.

18 Claims, 20 Drawing Sheets

(56) References Cited

U.S. PATENT DOCUMENTS

2015/0103416 A1\* 4/2015 Chen ................ G02B 27/0025
359/714

\* cited by examiner longitudinal aberration curve astigmatism curve longitudinal aberration curve longitudinal aberration curve astigmatism curve

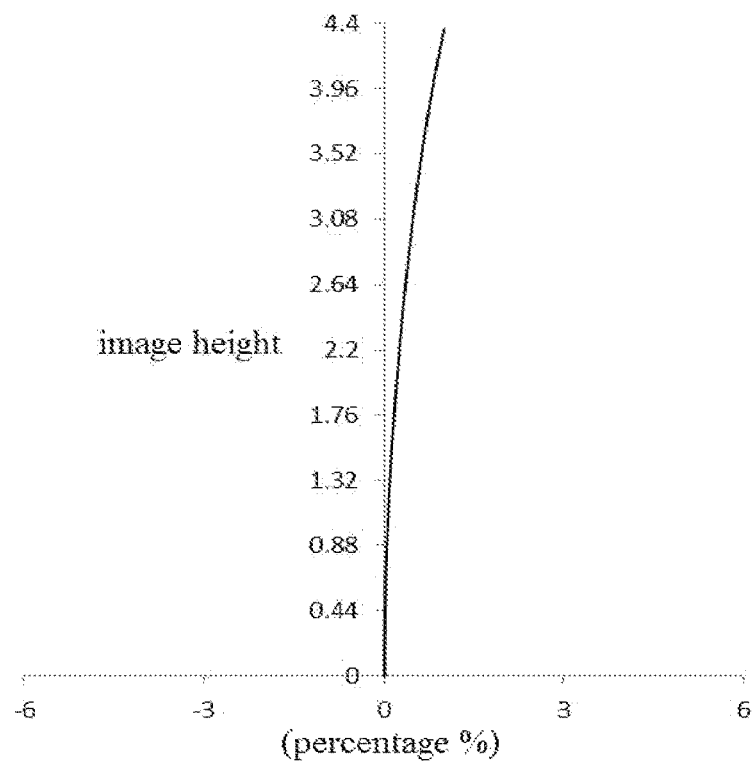
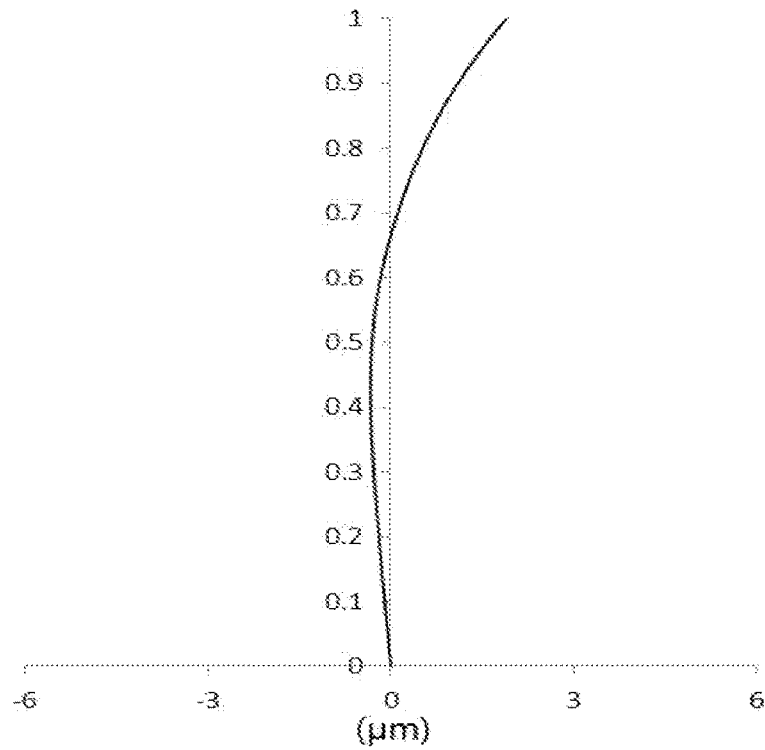

longitudinal aberration curve astigmatism curve distortion curve lateral color curve longitudinal aberration curve astigmatism curve distortion curve lateral color curve longitudinal aberration curve

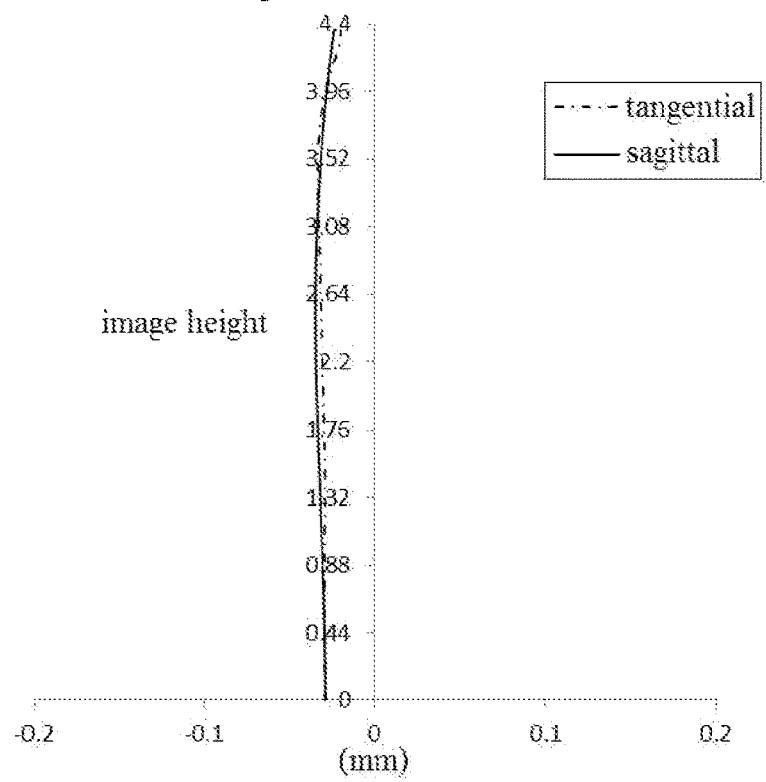
Fig. 14B astigmatism curve
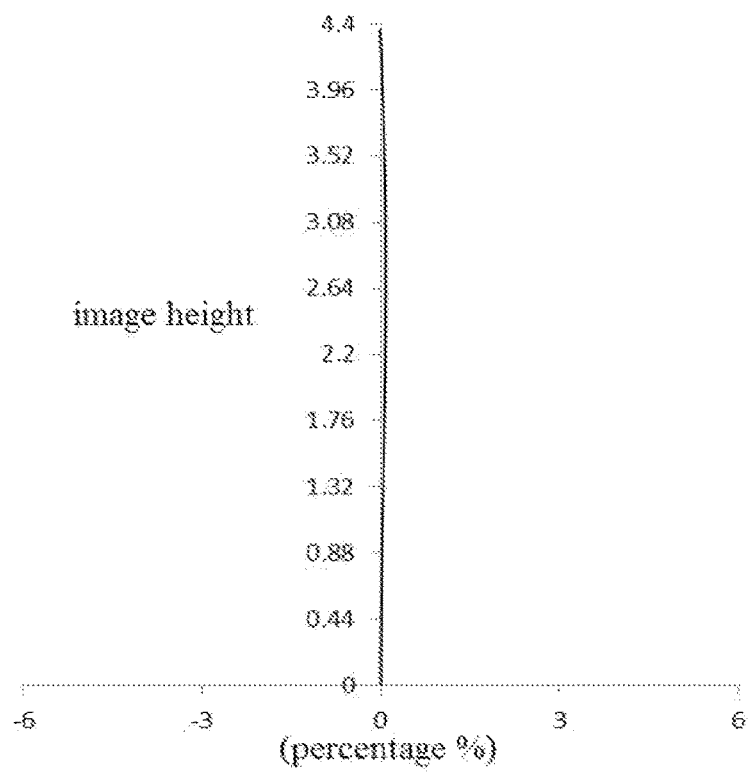
Fig. 14C distortion curve lateral color curve distortion curve lateral color curve

OPTICAL IMAGING LENS ASSEMBLY

CROSS-REFERENCE TO RELATED APPLICATION(S)

The disclosure claims priority to Chinese Patent Application No. 202010703192.8, filed on Jul. 21, 2020, and entitled "Optical Imaging Lens Assembly", the disclosure of which is hereby incorporated by reference in its entirety.

TECHNICAL FIELD

The disclosure relates to the field of optical elements, and particularly, the disclosure relates to an optical imaging lens assembly including five lenses.

BACKGROUND

In recent years, as intelligent terminals such as mobile phones have been rapidly developing, performance optimization of mobile devices such as the mobile phones has been oriented towards the improvement of a photographing function. For example, a rear camera module, of a high-end flagship mobile phone known to inventors, generally employs a solution of combining a super-definition main camera, a super-large wide-angle lens and a long-focus lens, and the lenses mostly employ a relay-baton-type method for zooming, that is, switching use of "wide angle-main camera-long focus" for zooming. By means of the method, the camera module achieves a zooming function of 5 times or even 10 times.

Being an important factor influencing a zoom range of the optical imaging lens assembly, the larger the focal length of the long-focus lens is, the larger the zoom range of the optical imaging lens assembly is. Generally, for a larger zoom range, most of the long-focus lenses employ periscopic long focus, of which the focal length generally ranges from 15 mm to 18 mm. The long-focus lens matches a short-focus lens, so as to achieve a 10-time zooming function of a mainstream optical imaging lens assembly.

Besides, the longer the focal length of the optical imaging lens assembly is, the larger the magnification of the optical imaging lens assembly is, which is more suitable for photographing distant objects, for example, selecting a long-focus optical imaging lens is more favorable for scenery photographing. However, a common long-focus lens hardly has a large imaging surface. Therefore, how to give consideration to the long-focus performance and the large image surface is a problem urgently to be solved for a zoom optical imaging lens assembly at present.

SUMMARY

Some embodiments of the disclosure provide an optical imaging lens assembly which is suitable for a portable electronic product and at least or partially solve at least one defect in the art known to inventors, for example, an optical imaging lens assembly with an ultra-long focus and an ultra-large image surface.

Some embodiments of the disclosure provide an optical imaging lens assembly, from an object side to an image side along an optical axis the optical imaging lens assembly sequentially include: a first lens having a positive refractive power; a second lens having a negative refractive power; a third lens having a refractive power; a fourth lens having a refractive power and an image-side surface of fourth lens is a concave surface; and a fifth lens having a refractive power; and wherein ImgH, half of a diagonal length of an effective pixel region on an imaging surface of the optical imaging lens assembly, TTL, a distance from an object-side surface of the first lens to the imaging surface on the optical axis, and f, a total effective focal length of the optical imaging lens assembly satisfy: ImgH/(TTL/f)>4.5 mm.

In an implementation mode, TTL, the distance from the object-side surface of the first lens to the imaging surface on the optical axis and f, the total effective focal length of the optical imaging lens assembly satisfy: 0.8<TTL/f<1.0.

In an implementation mode, f1, an effective focal length of the first lens, f2, an effective focal length of the second lens, f3, an effective focal length of the third lens and f4, an effective focal length of the fourth lens satisfy: 0.5<(f3−f1)/(f2−f4)<1.2.

In an implementation mode, R7, a radius of curvature of an object-side surface of the fourth lens and R8, a radius of curvature of an image-side surface of the fourth lens satisfy: 0.4<(R7−R8)/(R7+R8)<0.9.

In an implementation mode, R1, a radius of curvature of an object-side surface of the first lens and R2, a radius of curvature of an image-side surface of the first lens satisfy: 1.2<(R2−R1)/(R2+R1)<3.3.

In an implementation mode, f, the total effective focal length of the optical imaging lens assembly satisfies: 15 mm<f<20 mm.

In an implementation mode, FOV, a maximum field of view of the optical imaging lens assembly satisfies: 25°<FOV<30°.

In an implementation mode, f, the total effective focal length of the optical imaging lens assembly and FOV, a maximum field of view of the optical imaging lens assembly satisfy: f×tan(FOV/2)<5.0 mm.

In an implementation mode, T23, an air gap between the second lens and the third lens on the optical axis and T45, an air gap between the fourth lens and the fifth lens on the optical axis satisfy: 1.0<T45/T23<3.2.

In an implementation mode, DT11, a maximum effective radius of an object-side surface of the first lens and DT51, a maximum effective radius of an object-side surface of the fifth lens satisfy: 1.1<DT11/DT51<1.4.

In an implementation mode, DT12, a maximum effective radius of an image-side surface of the first lens and DT42, a maximum effective radius of an image-side surface of the fourth lens satisfy: 1.2<DT12/DT42<1.5.

In an implementation mode, TTL, a distance from an object-side surface of the first lens to the imaging surface on the optical axis and BFL, a distance from an image-side surface of the fifth lens to the imaging surface on the optical axis satisfy: 1.9<TTL/BFL<2.4.

In an implementation mode, f12, a combined focal length of the first lens and the second lens and f34, a combined focal length of the third lens and the fourth lens satisfy: 0.1<f12/f34<1.6.

Some other embodiments of the disclosure provide an optical imaging lens assembly, from an object side to an image side along an optical axis, the optical imaging lens assembly sequentially includes: a first lens having a positive refractive power; a second lens having a negative refractive power; a third lens having a refractive power; a fourth lens having a refractive power, and an image-side surface thereof is a concave surface; and a fifth lens having a refractive power; and wherein f, a total effective focal length of the optical imaging lens assembly satisfies: 15 mm<f<20 mm.

In an implementation mode, TTL, a distance from an object-side surface of the first lens to an imaging surface on the optical axis and f, the total effective focal length of the optical imaging lens assembly satisfy: $0.8 < TTL/f < 1.0$.

In an implementation mode, f1, an effective focal length of the first lens, f2, an effective focal length of the second lens, f3, an effective focal length of the third lens and f4, an effective focal length of the fourth lens satisfy: $0.5 < (f3-f1)/(f2-f4) < 1.2$.

In an implementation mode, R7, a radius of curvature of an object-side surface of the fourth lens and R8, a radius of curvature of an image-side surface of the fourth lens satisfy: $0.4 < (R7-R8)/(R7+R8) < 0.9$.

In an implementation mode, R1, a radius of curvature of an object-side surface of the first lens and R2, a radius of curvature of an image-side surface of the first lens satisfy: $1.2 < (R2-R1)/(R2+R1) < 3.3$.

In an implementation mode, ImgH, half of a diagonal length of an effective pixel region on an imaging surface of the optical imaging lens assembly, TTL, a distance from an object-side surface of the first lens to an imaging surface on the optical axis, and f, the total effective focal length of the optical imaging lens assembly satisfy: $ImgH/(TTL/f) > 4.5$ mm.

In an implementation mode, FOV, a maximum field of view of the optical imaging lens assembly satisfies: $25° < FOV < 30°$.

In an implementation mode, f, the total effective focal length of the optical imaging lens assembly and FOV, a maximum field of view of the optical imaging lens assembly satisfy: $f \times \tan(FOV/2) < 5.0$ mm.

In an implementation mode, T23, an air gap between the second lens and the third lens on the optical axis and T45, an air gap between the fourth lens and the fifth lens on the optical axis satisfy: $1.0 < T45/T23 < 3.2$.

In an implementation mode, DT11, a maximum effective radius of an object-side surface of the first lens and DT51, a maximum effective radius of an object-side surface of the fifth lens satisfy: $1.1 < DT11/DT51 < 1.4$.

In an implementation mode, DT12, a maximum effective radius of an image-side surface of the first lens and DT42, a maximum effective radius of an image-side surface of the fourth lens satisfy: $1.2 < DT12/DT42 < 1.5$.

In an implementation mode, TTL, a distance from an object-side surface of the first lens to the imaging surface on the optical axis and BFL, a distance from an image-side surface of the fifth lens to the imaging surface on the optical axis satisfy: $1.9 < TTL/BFL < 2.4$.

In an implementation mode, f12, a combined focal length of the first lens and the second lens and f34, a combined focal length of the third lens and the fourth lens satisfy: $0.1 < f12/f34 < 1.6$.

Some embodiments of the disclosure provide an optical imaging lens assembly, which employs a plurality of lenses, for example, the first lens to the fifth lens, a relation among an optical total length of an optical imaging system, a total effective focal length and half of a diagonal length of an effective pixel region on the imaging surface is reasonably controlled, and a refractive power, a surface type, a radius of curvature and an effective focal length of each lens are optimally provided, such that the optical imaging lens assembly has a larger imaging surface and higher imaging quality while achieving ultra-long focal length function, and meanwhile, lenses are compact in structure and good in forming machining performance, which improves the production yield of the camera module.

BRIEF DESCRIPTION OF THE DRAWINGS

Other features, objectives, and advantages of the disclosure will become more apparent by means of the detailed description on non-limiting embodiments in conjunction with the drawings. In the drawings:

FIGS. 8A-8D show a longitudinal aberration curve, an astigmatism curve, a distortion curve and a lateral color curve of the optical imaging lens assembly in Embodiment 4 respectively;

FIGS. 14A-14D show a longitudinal aberration curve, an astigmatism curve, a distortion curve and a lateral color curve of the optical imaging lens assembly in Embodiment 7 respectively;

DETAILED DESCRIPTION OF THE EMBODIMENTS

Figure 1:
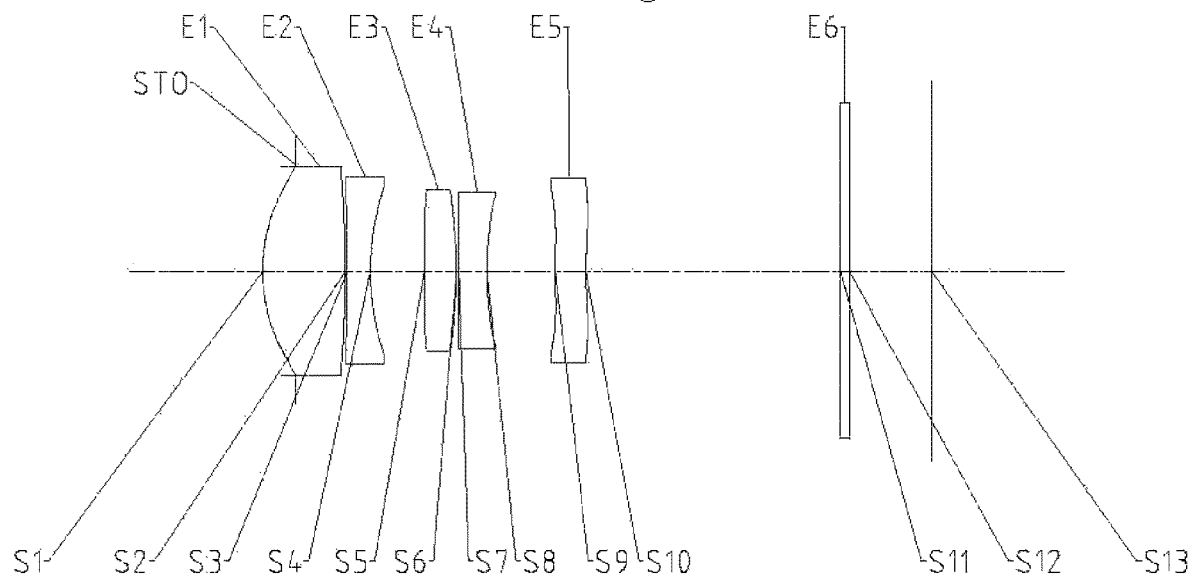
FIG. 1 shows a structural schematic diagram of an optical imaging lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by the general technical personnel in the field of the disclosure. It also should be understood that the terms (for example, terms defined in a common dictionary) should be explained to have meanings consistent with the meanings in the context of correlation technique and cannot be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

The optical imaging lens assembly according to the exemplary implementation mode of the disclosure includes five lenses having refractive power, which are a first lens, a second lens, a third lens, a fourth lens, and a fifth lens. These five lenses are sequentially arranged along an optical axis from an object side to an image side. An air gap is provided between every two adjacent lenses in the first lens to the fifth lens.

In an exemplary implementation mode, a first lens has a positive refractive power; a second lens has a negative refractive power; a third lens has a positive refractive power or negative refractive power; a fourth lens has a positive refractive power or negative refractive power, and an image-side surface of the fourth lens is a concave surface; and a fifth lens has a positive refractive power or negative refractive power. The first lens has a positive refractive power to facilitate convergence of light of a field of view of the optical imaging system, the second lens has a negative refractive power to facilitate compensation of spherical aberration of the first lens, and the image-side surface of the fourth lens is the concave surface to facilitate compensation of spherical aberration of the first lens to the third lens.

In an exemplary implementation mode, an object-side surface of the first lens is a convex surface, and an image-side surface of the first lens is a convex surface.

In an exemplary implementation mode, an image-side surface of the second lens is a concave surface.

In an exemplary implementation mode, an object-side surface of the fourth lens is a convex surface, and the image-side surface is a concave surface.

In an exemplary implementation mode, ImgH, half of a diagonal length of an effective pixel region on an imaging surface of the optical imaging lens assembly, TTL, a distance from an object-side surface of the first lens to the imaging surface on the optical axis, and f, a total effective focal length of the optical imaging lens assembly satisfy: ImgH/(TTL/f)>4.5 mm. For example, 4.5 mm<ImgH/(TTL/f)<5.0 mm. A mutual relation among the optical total length of the optical imaging lens assembly, the total effective focal length and half of the diagonal length of the effective pixel area on the imaging surface is reasonably controlled, which guarantees that the optical imaging lens assembly has a large imaging surface while having a large telephoto ratio TTL/f, and achieves an ultra-definition telephoto function of the optical imaging lens assembly.

In an exemplary implementation mode, TTL, a distance from the object-side surface of the first lens to the imaging surface on the optical axis and f, the total effective focal length of the optical imaging lens assembly satisfy: 0.8<TTL/f<1.0. The ratio of the total optical length of the optical imaging lens to the total effective focal length is controlled within a ration numerical range, which effectively guarantees that the optical imaging lens assembly has a proper telephoto ratio TTL/f, and achieves the long-focus function of the optical imaging lens assembly.

In an exemplary implementation mode, f1, an effective focal length of the first lens, f2, an effective focal length of the second lens, f3, an effective focal length of the third lens and f4, an effective focal length of the fourth lens satisfy: 0.5<(f3−f1)/(f2−f4)<1.2. A mutual relation among the effective focal lengths of the first lens, the second lens, the third lens and the fourth lens is reasonably controlled, which facilitates the rational distribution of the refractive power of each lens in a space of the optical imaging system, and facilitates the reduction of the aberration of the optical imaging lens assembly.

In an exemplary implementation mode, R7, a radius of curvature of an object-side surface of the fourth lens and R8, a radius of curvature of an image-side surface of the fourth lens satisfy: 0.4<(R7−R8)/(R7+R8)<0.9. The ratio of the radius of curvature of the object-side surface to the radius of curvature of the image-side surface of the fourth lens is controlled within a reasonable numerical range, thereby favorably controlling the astigmatism of the object-side surface and the image-side surface of the fourth lens, and further effectively controlling an imaging quality of a middle field of view and an aperture band of the optical imaging lens assembly.

In an exemplary implementation mode, R1, a radius of curvature of the object-side surface of the first lens and R2, a radius of curvature of an image-side surface of the first lens satisfy: 1.2<(R2−R1)/(R2+R1)<3.3. A mutual relation between the radii of curvature of the object-side surface and the image-side surface of the first lens is reasonably controlled, thereby better controlling the astigmatism of the object-side surface and the image-side surface of the first lens, and then effectively controlling the imaging quality of the middle field of view and the aperture band of the optical imaging lens assembly.

In an exemplary implementation mode, f, the total effective focal length of the optical imaging lens assembly satisfies: 15 mm<f<20 mm. A value range of the total effective focal length of the optical imaging lens assembly is reasonably controlled, which may guarantee that the optical imaging lens assembly has the ultra-long-focus function.

In an exemplary implementation mode, FOV, a maximum field of view of the optical imaging lens assembly satisfies: 25°<FOV<30°. The value range of the maximum field of view of the optical imaging lens assembly is reasonably controlled, which may guarantee that the optical imaging lens assembly has a large field of view.

In an exemplary implementation mode, f, the total effective focal length of the optical imaging lens assembly and FOV, a maximum field of view of the optical imaging lens assembly satisfy: f×tan(FOV/2)<5.0 mm. For example, 4.0 mm<f×tan(FOV/2)<5.0 mm. A mutual relation between the total effective focal length and the maximum field of view of the optical imaging lens assembly is reasonably controlled, which may guarantee that the optical imaging lens assembly has a larger imaging surface.

In an exemplary implementation mode, T23, an air gap between the second lens and the third lens on the optical axis and T45, an air gap between the fourth lens and the fifth lens on the optical axis satisfy: 1.0<T45/T23<3.2. The ratio of the air gap between the second lens and the third lens to the air gap between the fourth lens and the fifth lens on the optical axis is controlled within a reasonable numerical range, such that the situation that the spatial arrangement of the lens is difficult due to the fact that the thicknesses of the second lens, the third lens, the fourth lens and the fifth lens are too large is effectively avoided, which facilitates assembly of the optical imaging lens.

In an exemplary implementation mode, DT11, a maximum effective radius of an object-side surface of the first lens and DT51, a maximum effective radius of an object-side surface of the fifth lens satisfy: 1.1<DT11/DT51<1.4. The ratio of the maximum effective radius of the object-side surface of the first lens to the maximum effective radius of the object-side surface of the fifth lens is controlled within a reasonable numerical range, which facilitates that the optical imaging lens assembly has a larger imaging surface, and makes the spatial distribution of the optical imaging lens assembly more rational.

In an exemplary implementation mode, DT12, a maximum effective radius of an image-side surface of the first lens and DT42, a maximum effective radius of an image-side surface of the fourth lens satisfy: 1.2<DT12/DT42<1.5. The ratio of the maximum effective radius of the image-side surface of the first lens to the maximum effective radius of the image-side surface of the fourth lens is controlled within a reasonable numerical range, which facilitates that the optical imaging lens assembly has a larger imaging surface, and makes the spatial distribution of the optical imaging lens assembly more rational.

In an exemplary implementation mode, TTL, a distance from an object-side surface of the first lens to the imaging surface on the optical axis and BFL, a distance from the image-side surface of the fifth lens to the imaging surface on the optical axis satisfy: 1.9<TTL/BFL<2.4. The ratio of the total optical length to a rear focal length of the optical imaging lens assembly is controlled within a reasonable numerical range, which facilitates the overall structural layout of the optical imaging lens assembly.

In an exemplary implementation mode, f12, a combined focal length of the first lens and the second lens and f34, a combined focal length of the third lens and the fourth lens satisfy: 0.1<f12/f34<1.6. The ratio of the combined focal length of the first lens and the second lens to the combined focal length of the third lens and the fourth lens is controlled within a reasonable numerical range, which facilitates rational distribution of refractive power of the first lens, the second lens, the third lens and the fourth lens in space, and reduces aberration of the optical imaging lens assembly.

In an exemplary implementation mode, the optical imaging lens assembly also includes a diaphragm. The diaphragm is disposed at a proper position as required. In some embodiments, the diaphragm is disposed between the object side and the first lens. In some embodiments, the optical imaging lens assembly further includes an optical filter used for correcting color deviation. In some embodiments, the optical imaging lens further includes a protective glass used for protecting a photosensitive element located on the imaging surface. And in some embodiments, the optical imaging lens assembly further includes an optical filter used for correcting color deviation and a protective glass used for protecting a photosensitive element located on the imaging surface.

An exemplary implementation mode of the disclosure provides an optical imaging lens assembly which has features of ultra-long focus, ultra-large image surface, etc. The optical imaging lens assembly according to the above-described implementation modes of the disclosure employs a plurality of lenses, for example, the five lenses described above. By reasonably distributing the refractive power of each lens, the surface types, the center thickness of each lens, the on-axis distance between the lenses, etc., incident light is effectively converged, a total optical length of the imaging lens assembly is reduced, the machinability of the imaging lens assembly is improved, and accordingly, the optical imaging lens assembly is more easy to produce and machine.

In an exemplary implementation mode, at least one of the mirror surfaces of each lens is an aspherical mirror surface, that is, at least one mirror surface from an object-side surface of the first lens to an image-side surface of the fifth lens is an aspherical mirror surface. The aspherical lens has the features that the curvature varies continuously from a center of the lens to a periphery of the lens. Different from a spherical lens having a constant curvature from the center of the lens to the periphery of the lens, the aspherical lens has a better feature of a radius of curvature and has the advantages of improving distortion aberration and astigmatism aberration. After the aspherical lens is used, aberration occurring during imaging is eliminated as much as possible, thereby improving the imaging quality. Optionally, at least one of the object-side surface and the image-side surface of each of the first lens, the second lens, the third lens, the fourth lens and the fifth lens is an aspherical mirror surface. In some embodiments, both of the object-side surface and the image-side surface of each of the first lens, the second lens, the third lens, the fourth lens and the fifth lens are aspherical mirror surfaces.

An implementation mode of the disclosure also provides an imaging device, wherein an electronic photosensitive element is a Charge Coupled Device (CCD) or a Complementary Metal Oxide Semiconductor (CMOS). In some embodiments, the imaging device is a stand-alone imaging device, such as a digital camera, or an imaging module integrated on mobile electronic equipment, such as a cell phone. The imaging device is equipped with the optical imaging lens assembly described above.

However, it should be understood by those skilled in the art that the number of lenses constituting the optical imaging lens assembly may be varied to obtain various results and advantages described in this specification without departing from the claimed technical solution. For example, although described with five lenses as an example in an implementation mode, the optical imaging lens assembly is not limited to including five lenses. The optical imaging lens assembly may also include other numbers of lenses if desired.

Specific embodiments of the optical imaging lens assembly that may be suitable for use in the above implementation mode are described further below with reference to the accompanying drawings.

Embodiment 1

An optical imaging lens assembly according to Embodiment 1 of the disclosure is described below with reference to FIGS. 1-2D. FIG. 1 shows a structural schematic diagram of an optical imaging lens assembly according to Embodiment 1 of the disclosure.

As shown in FIG. 1, from an object side to an image side along an optical axis, the optical imaging lens assembly sequentially includes a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The optical filter E6 is provided with an object-side surface S11 and an image-side surface S12. Light from an object sequentially passes through each of the surfaces S1 to S12 and is finally imaged on the imaging surface S13.

Table 1 shows a table of basic parameters for the optical imaging lens assembly of Embodiment 1, wherein the units of the radius of curvature, thickness, and focal length are all millimeters (mm).

TABLE 1

| Surface number | Surface type | Radius of curvature | Thickness/ distance | Refractive index | Abbe number | Focal length | Conic coefficient |
|---|---|---|---|---|---|---|---|
| OBJ | Spherical | Infinity | Infinity | | | | |
| STO | Spherical | Infinity | −0.7717 | | | | |
| S1 | Aspherical | 3.8844 | 1.8800 | 1.54 | 56.1 | 6.29 | −2.0785 |
| S2 | Aspherical | −24.5090 | 0.0500 | | | | 98.8580 |
| S3 | Aspherical | 313.9916 | 0.5200 | 1.65 | 23.5 | −7.96 | 8.2758 |
| S4 | Aspherical | 5.0345 | 1.2259 | | | | −0.4055 |
| S5 | Aspherical | −57.2329 | 0.7300 | 1.65 | 23.5 | 13.77 | 56.0406 |
| S6 | Aspherical | −7.7102 | 0.0500 | | | | −25.0262 |
| S7 | Aspherical | 20.0943 | 0.6400 | 1.54 | 56.1 | −15.33 | 98.9999 |
| S8 | Aspherical | 5.8393 | 1.5441 | | | | −0.5634 |
| S9 | Aspherical | 16.9378 | 0.7100 | 1.54 | 56.1 | −36.73 | −18.2986 |
| S10 | Aspherical | 9.0427 | 5.7708 | | | | −32.3859 |
| S11 | Spherical | Infinity | 0.2100 | 1.52 | 64.2 | | |
| S12 | Spherical | Infinity | 1.8709 | | | | |
| S13 | Spherical | Infinity | | | | | |

In this embodiment, f, a total effective focal length of the optical imaging lens assembly, equals 16.82 mm, TTL, a distance from an object-side surface S1 of the first lens E1 to the imaging surface S13 on the optical axis, equals 15.20 mm, and ImgH, half of a diagonal length of an effective pixel region on the imaging surface S13, equals 4.35 mm.

In Embodiment 1, both of the object-side surface and the image-side surface of any one of the first lens E1 to the fifth lens E5 are aspherical surfaces, and a surface type x of each aspherical lens is defined by, but is not limited to, the following aspherical formula:

$$x = \frac{ch^2}{1+\sqrt{1-(k+1)c^2h^2}} + \sum A_i h^i, \qquad (1)$$

Wherein x is a vector height of a distance between the aspherical surface and a vertex of the aspherical surface when the aspherical surface is located at a position with the height h in the optical axis direction; c is a paraxial curvature of the aspherical surface, c=1/R (that is, the paraxial curvature c is a reciprocal of the radius of curvature R in Table 1 above); k is a conic coefficient; and Ai is a correction coefficient of the i-th order of the aspherical surface. Table 2 below gives higher order term coefficients $A_4$, $A_6$, $A_8$, $A_{10}$, $A_{12}$, $A_{14}$, $A_{16}$, $A_{18}$ and $A_{20}$ that are used for each of the aspherical mirror surfaces S1-S10 in Embodiment 1.

TABLE 2

| Surface number | A4 | A6 | A8 | A10 | A12 |
|---|---|---|---|---|---|
| S1 | 4.2972E−03 | −1.3833E−04 | 4.0303E−05 | −2.0939E−05 | 7.6629E−06 |
| S2 | −1.0839E−02 | 2.0895E−02 | −1.8049E−02 | 1.0720E−02 | −4.4153E−03 |
| S3 | −2.3427E−02 | 2.5229E−02 | −1.9189E−02 | 1.0921E−02 | −4.4784E−03 |
| S4 | −1.5687E−02 | 9.2062E−03 | −5.0414E−03 | 2.5241E−03 | −1.1182E−03 |
| S5 | 1.3714E−02 | −6.8054E−03 | 1.1638E−02 | −1.2927E−02 | 8.3056E−03 |
| S6 | −1.0501E−02 | 9.9159E−03 | 3.0513E−02 | −5.8173E−02 | 4.6813E−02 |
| S7 | −5.2897E−02 | 2.1096E−02 | 4.3790E−02 | −8.3942E−02 | 6.8849E−02 |
| S8 | −3.6144E−02 | 9.0999E−03 | 1.6883E−02 | −2.6517E−02 | 2.0907E−02 |
| S9 | −2.5196E−02 | 2.3955E−03 | −1.2089E−04 | 1.0249E−03 | −9.6839E−04 |
| S10 | −1.6397E−02 | 5.9696E−04 | 1.0888E−03 | −5.7333E−04 | 1.5747E−04 |

| Surface number | A14 | A16 | A18 | A20 |
|---|---|---|---|---|
| S1 | −1.8859E−06 | 2.2778E−07 | −1.0568E−08 | −7.0272E−11 |
| S2 | 1.1981E−03 | −2.0141E−04 | 1.8922E−05 | −7.5864E−07 |
| S3 | 1.2384E−03 | −2.1449E−04 | 2.0852E−05 | −8.6682E−07 |
| S4 | 3.8899E−04 | −8.8753E−05 | 1.1285E−05 | −6.0045E−07 |
| S5 | −3.2635E−03 | 7.7604E−04 | −1.0281E−04 | 5.8297E−06 |
| S6 | −2.1298E−02 | 5.6797E−03 | −8.2841E−04 | 5.1034E−05 |
| S7 | −3.2148E−02 | 8.8216E−03 | −1.3247E−03 | 8.3957E−05 |
| S8 | −9.8846E−03 | 2.8092E−03 | −4.4028E−04 | 2.9129E−05 |
| S9 | 4.4017E−04 | −1.1051E−04 | 1.4859E−05 | −8.4167E−07 |
| S10 | −2.2793E−05 | 8.4294E−07 | 2.1156E−07 | −2.2498E−08 |

Figure 2A:
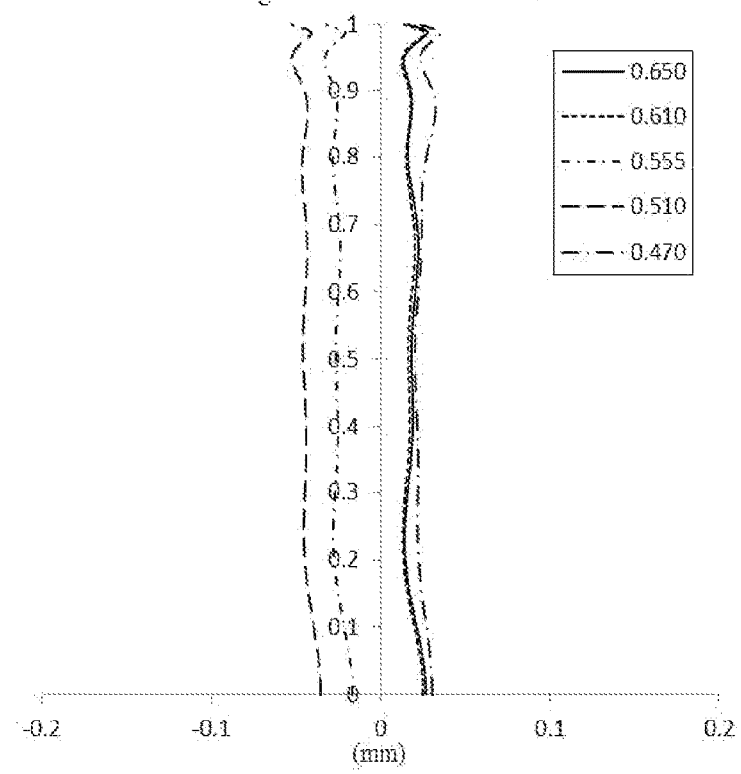
FIGS. 2A-2D show a longitudinal aberration curve, an astigmatism curve, a distortion curve and a lateral color curve of the optical imaging lens assembly in Embodiment 1 respectively.
Figure 2B:
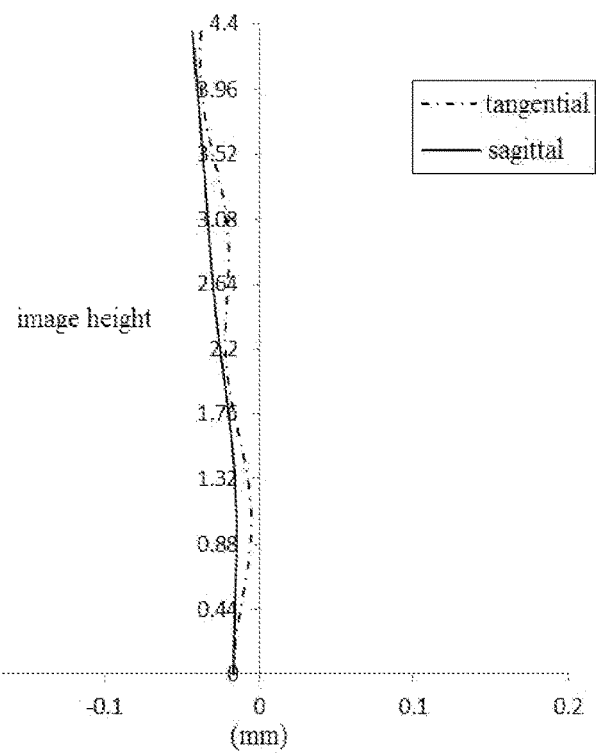
Figure 2C:
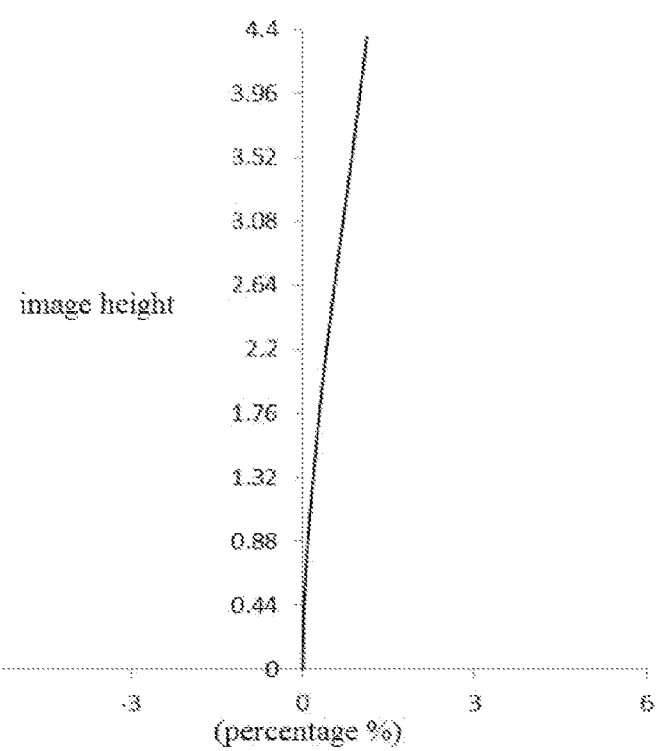
Figure 2D:
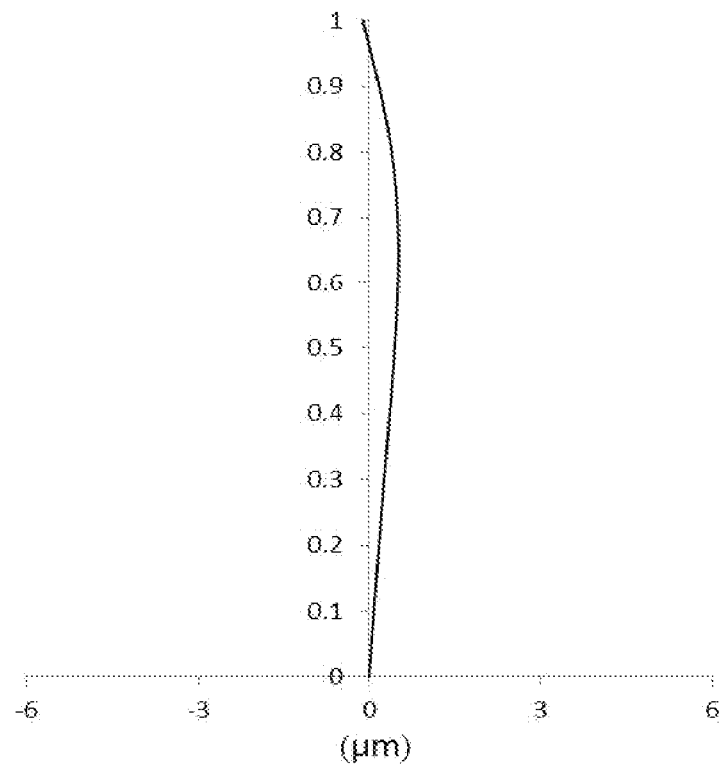

FIG. 2A shows a longitudinal aberration curve of the optical imaging lens assembly in Embodiment 1, which represents deviation of a convergence focal point after light with different wavelengths passes through the lens. FIG. 2B shows an astigmatism curve of the optical imaging lens assembly of Embodiment 1, which represents a tangential image surface curvature and a sagittal image surface curvature. FIG. 2C shows a distortion curve of the optical imaging lens assembly of Embodiment 1, which represents distortion values corresponding to different image heights. FIG. 2D shows a lateral color curve of the optical imaging lens assembly in Embodiment 1, which represents deviation of different image heights on the imaging surface after the light passes through the lens. According to FIG. 2A to FIG. 2D, it can be seen that the optical imaging lens assembly provided in Embodiment 1 achieves good imaging quality.

Embodiment 2

Figure 3:
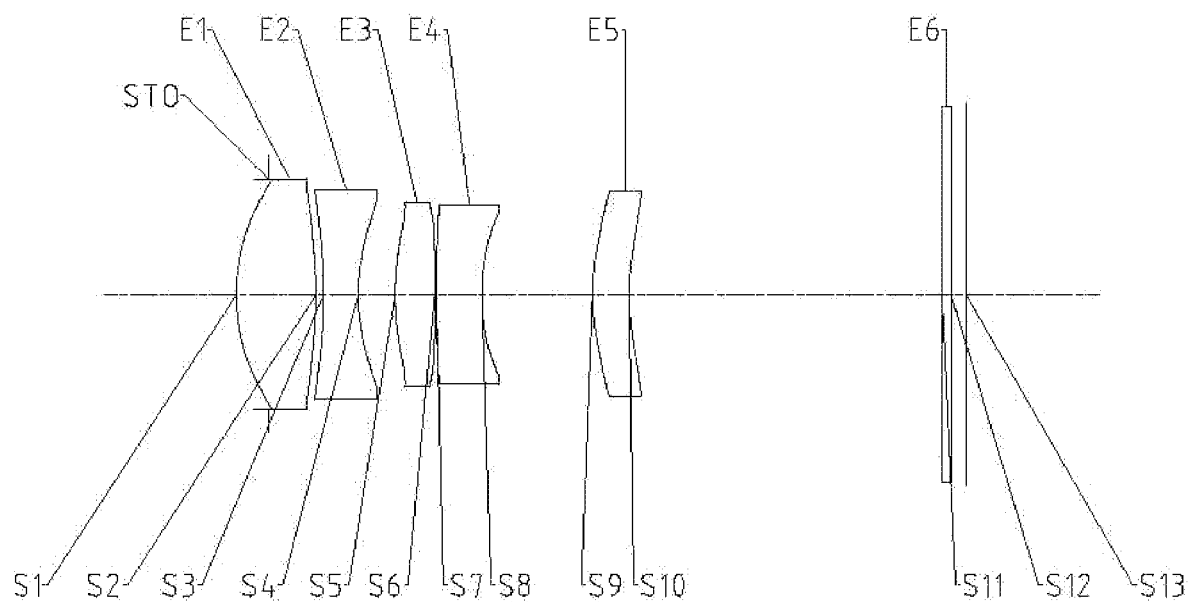
FIG. 3 shows a structural schematic diagram of an optical imaging lens assembly according to Embodiment 2 of the disclosure.

An optical imaging lens assembly according to Embodiment 2 of the disclosure is described below with reference to FIGS. 3-4D. FIG. 3 shows a structural schematic diagram of an optical imaging lens assembly according to Embodiment 2 of the disclosure.

As shown in FIG. 3, from an object side to an image side along an optical axis, the optical imaging lens assembly sequentially includes: a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, and an image-side surface S2 thereof is a convex surface. The second lens E2 has a negative refractive power, an object-side surface S3 thereof is a concave surface, and an image-side surface S4 thereof is a concave surface. The first lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a concave surface. The optical filter E6 is provided with an object-side surface S11 and an image-side surface S12. Light from an object sequentially passes through each of the surfaces from S1 to S12 and is finally imaged on the imaging surface S13.

In this embodiment, f, a total effective focal length of the optical imaging lens assembly, equals 17.35 mm, TTL, a distance from an object-side surface S1 of the first lens E1 to the imaging surface S13 on the optical axis, equals 16.51 mm, and ImgH, half of a diagonal length of an effective pixel region on the imaging surface S13, equals 4.36 mm.

Table 3 shows a table of basic parameters for the optical imaging lens assembly of Embodiment 2, wherein the units of the radius of curvature, thickness, and focal length are all millimeters (mm).

TABLE 3

| | | | | Material | | | |
|---|---|---|---|---|---|---|---|
| Surface number | Surface type | Radius of curvature | Thickness/ distance | Refractive index | Abbe number | Focal length | Conic coefficient |
| OBJ | Spherical | Infinity | Infinity | | | | |
| STO | Spherical | Infinity | −0.7214 | | | | |
| S1 | Aspherical | 4.5001 | 1.8000 | 1.54 | 56.1 | 6.00 | −0.9876 |
| S2 | Aspherical | −10.3032 | 0.1640 | | | | −8.4049 |
| S3 | Aspherical | −22.5216 | 0.7880 | 1.62 | 25.9 | −5.22 | 6.7640 |

TABLE 3-continued

| Surface number | Surface type | Radius of curvature | Thickness/ distance | Material Refractive index | Abbe number | Focal length | Conic coefficient |
|---|---|---|---|---|---|---|---|
| S4 | Aspherical | 3.8245 | 0.8380 | | | | −2.1983 |
| S5 | Aspherical | 6.2567 | 0.8955 | 1.68 | 19.2 | 8.88 | −9.5482 |
| S6 | Aspherical | −148.6229 | 0.0400 | | | | 99.0000 |
| S7 | Aspherical | 22.2764 | 1.0272 | 1.62 | 25.9 | −10.41 | 99.0000 |
| S8 | Aspherical | 4.9115 | 2.5132 | | | | 1.5182 |
| S9 | Aspherical | 4.9257 | 0.8287 | 1.54 | 56.1 | 57.77 | −5.0389 |
| S10 | Aspherical | 5.4916 | 7.0647 | | | | −15.3324 |
| S11 | Spherical | Infinity | 0.2100 | 1.52 | 64.2 | | |
| S12 | Spherical | Infinity | 0.3434 | | | | |
| S13 | Spherical | Infinity | | | | | |

In Embodiment 2, both of the object-side surface and the image-side surface of any one of the first lens E1 to the fifth lens E5 are aspherical surfaces. Table 4 gives higher order term coefficients $A_4$, $A_6$, $A_8$, $A_{10}$, $A_{12}$, $A_{14}$, $A_{16}$, $A_{18}$ and $A_{20}$ that may be used for each of the aspherical mirror surfaces S1-S10 in Embodiment 2.

TABLE 4

| Surface number | A4 | A6 | A8 | A10 | A12 |
|---|---|---|---|---|---|
| S1 | 1.6341E−03 | −9.2387E−06 | 1.9395E−05 | −1.2239E−05 | 2.7753E−06 |
| S2 | 1.5060E−03 | 1.2520E−03 | −8.6306E−04 | 3.2850E−04 | −8.1103E−05 |
| S3 | −1.3399E−02 | 5.4673E−03 | −1.3668E−03 | 3.2918E−04 | −7.6835E−05 |
| S4 | −1.8167E−02 | 3.8502E−03 | 4.2505E−04 | −2.4608E−04 | −1.6472E−05 |
| S5 | 7.3228E−03 | −6.6525E−03 | 2.8144E−03 | −6.1889E−04 | −2.9824E−05 |
| S6 | 1.4315E−03 | −3.6085E−02 | 3.6702E−02 | −2.2122E−02 | 8.2861E−03 |
| S7 | 1.1373E−03 | −3.0092E−02 | 3.7969E−02 | −2.4462E−02 | 9.5489E−03 |
| S8 | −1.0290E−02 | 5.2994E−03 | −1.2481E−04 | −9.5549E−04 | 6.8164E−04 |
| S9 | −6.1151E−03 | 1.2154E−04 | 4.4523E−04 | −2.7848E−04 | 1.1932E−04 |
| S10 | 3.8806E−04 | −2.2347E−03 | 1.0855E−03 | −4.0385E−04 | 1.1788E−04 |

| Surface number | A14 | A16 | A18 | A20 |
|---|---|---|---|---|
| S1 | −2.9732E−07 | 5.3972E−09 | 9.7543E−10 | −4.2387E−11 |
| S2 | 1.2303E−05 | −1.0914E−06 | 5.1781E−08 | −1.0126E−09 |
| S3 | 1.2818E−05 | −1.2554E−06 | 6.3548E−08 | −1.2792E−09 |
| S4 | 2.3113E−05 | −4.8172E−06 | 4.0746E−07 | −1.1327E−08 |
| S5 | 4.0674E−05 | −7.7783E−06 | 5.5832E−07 | −7.7084E−09 |
| S6 | −1.9750E−03 | 2.9305E−04 | −2.4778E−05 | 9.1455E−07 |
| S7 | −2.3449E−03 | 3.5504E−04 | −3.0296E−05 | 1.1093E−06 |
| S8 | −2.5483E−04 | 5.4502E−05 | −6.2008E−06 | 2.8076E−07 |
| S9 | −3.2882E−05 | 5.5380E−06 | −5.1585E−07 | 2.0272E−08 |
| S10 | −2.3967E−05 | 3.1014E−06 | −2.2517E−07 | 6.8575E−09 |

Figure 4A:
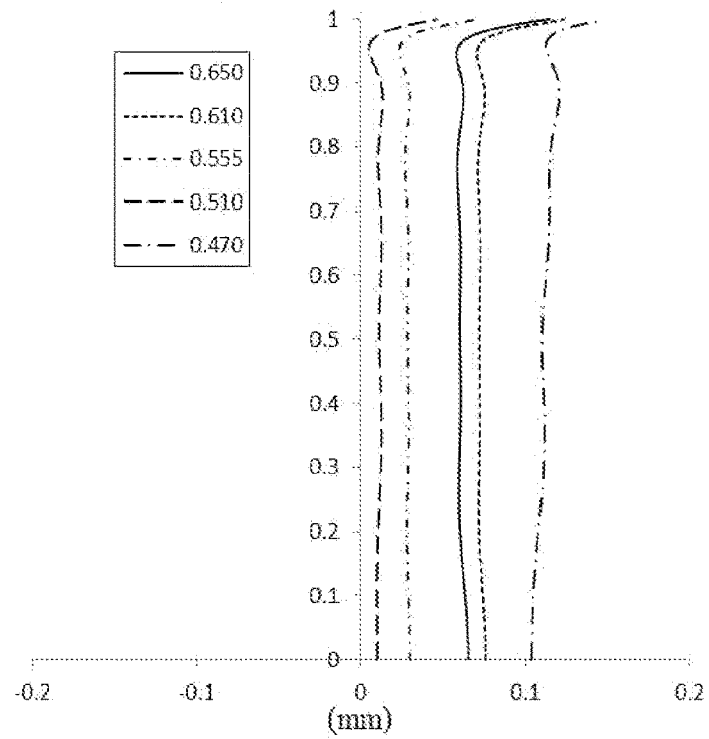
FIGS. 4A-4D show a longitudinal aberration curve, an astigmatism curve, a distortion curve and a lateral color curve of the optical imaging lens assembly in Embodiment 2 respectively.
Figure 4B:
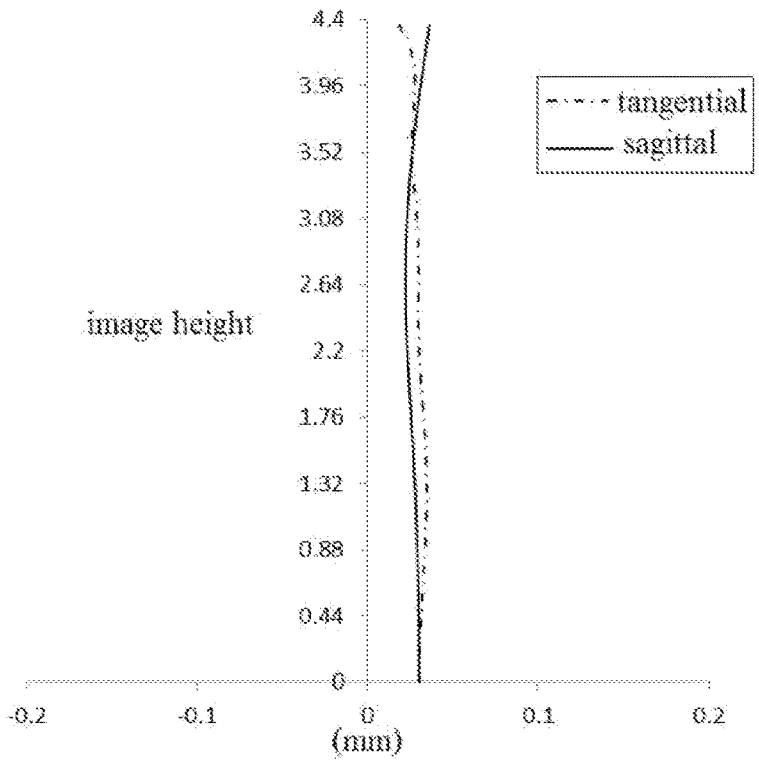
Figure 4C:
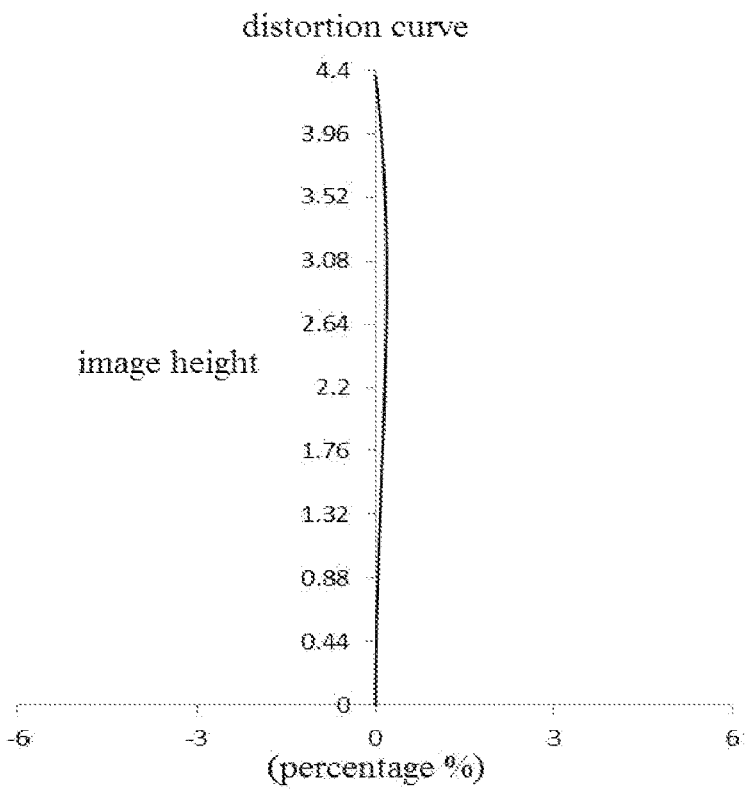
Figure 4D:
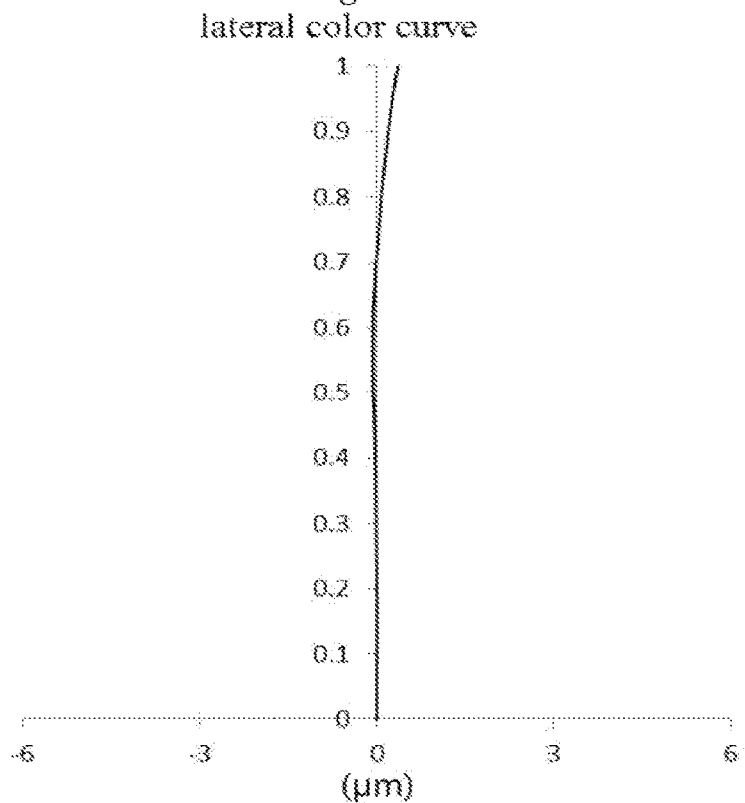

FIG. 4A shows a longitudinal aberration curve of the optical imaging lens assembly in Embodiment 2, which represents that deviation of a convergence focal point after light with different wavelengths passes through the lens. FIG. 4B shows an astigmatism curve of the optical imaging lens assembly of Embodiment 2, which represents a tangential image surface curvature and a sagittal image surface curvature. FIG. 4C shows a distortion curve of the optical imaging lens assembly of Embodiment 2, which represents distortion values corresponding to different image heights. FIG. 4D shows a lateral color curve of the optical imaging lens assembly in Embodiment 2, which represents deviation of different image heights on the imaging surface after the light passes through the lens. According to FIG. 4A FIG. 4D, it can be seen that the optical imaging lens assembly provided in Embodiment 2 achieves good imaging quality.

Embodiment 3

Figure 5:
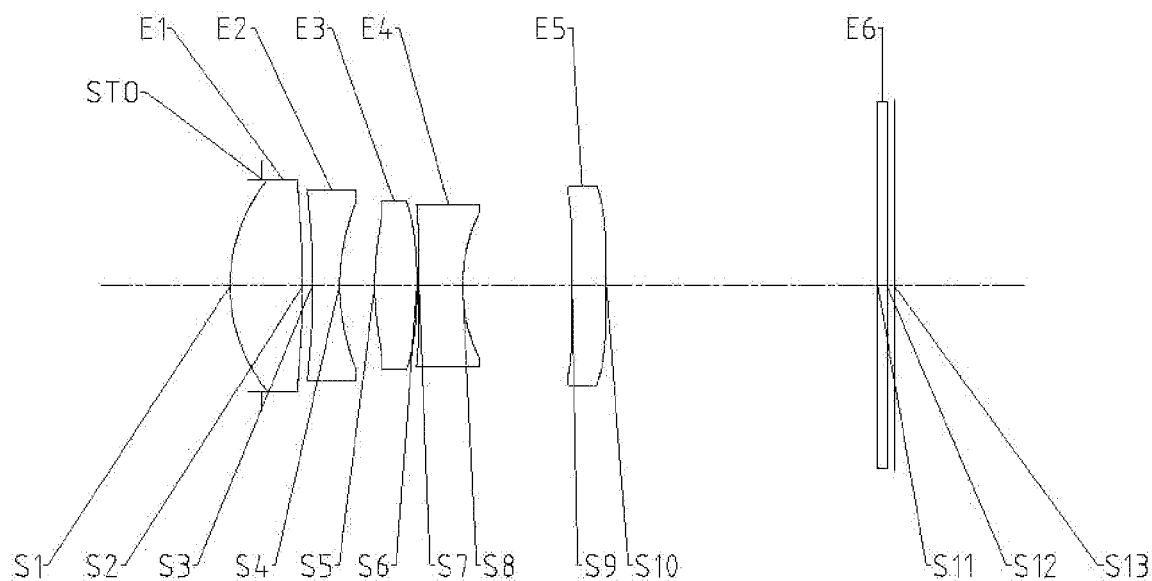
FIG. 5 shows a structural schematic diagram of an optical imaging lens assembly according to Embodiment 3 of the disclosure.

An optical imaging lens assembly according to Embodiment 3 of the disclosure is described below with reference to FIGS. 5-6D. FIG. 5 shows a structural schematic diagram of an optical imaging lens assembly according to Embodiment 3 of the disclosure.

As shown in FIG. 5, from an object side to an image side along an optical axis, the optical imaging lens assembly sequentially includes: a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, and an image-side surface S2 thereof is a convex surface. The second lens E2 has a negative refractive power, an object-side surface S3 thereof is a concave surface, and an image-side surface S4 thereof is a concave surface. The first lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The optical filter E6 is provided with an object-side surface S11 and an image-side surface S12. Light from an object sequentially passes through each of the surfaces from S1 to S12 and is finally imaged on the imaging surface S13.

In this embodiment, f, a total effective focal length of the optical imaging lens equals 16.78 mm, TTL, a distance from an object-side surface S1 of the first lens E1 to the imaging surface S13 on the optical axis equals 15.52 mm, and ImgH, half of a diagonal length of an effective pixel region on the imaging surface S13 equals 4.36 mm.

Table 5 shows a table of basic parameters for the optical imaging lens assembly of Embodiment 3, wherein the units of the radius of curvature, thickness, and focal length are all millimeters (mm).

TABLE 5

| Surface number | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.7381 | | | | |
| S1 | Aspherical | 3.9951 | 1.7000 | 1.54 | 56.1 | 6.04 | −1.2689 |
| S2 | Aspherical | −16.0349 | 0.2170 | | | | 4.2657 |
| S3 | Aspherical | −188.5885 | 0.6351 | 1.65 | 23.5 | −5.76 | 1.8619 |
| S4 | Aspherical | 3.7890 | 0.8300 | | | | −1.5658 |
| S5 | Aspherical | 7.6389 | 0.9859 | 1.68 | 19.2 | 7.19 | −13.8508 |
| S6 | Aspherical | −12.7547 | 0.0400 | | | | 21.0162 |
| S7 | Aspherical | 27.5911 | 1.0233 | 1.62 | 25.9 | −6.97 | 99.0000 |
| S8 | Aspherical | 3.6817 | 2.5554 | | | | 0.0845 |
| S9 | Aspherical | 60.5517 | 0.8043 | 1.54 | 56.1 | 78.72 | 99.0000 |
| S10 | Aspherical | −146.9888 | 6.3494 | | | | 99.0000 |
| S11 | Spherical | Infinity | 0.2100 | 1.52 | 64.2 | | |
| S12 | Spherical | Infinity | 0.1703 | | | | |
| S13 | Spherical | Infinity | | | | | |

In Embodiment 3, both of the object-side surface and the image-side surface of any one of the first lens E1 to the fifth lens E5 are aspherical surfaces. Table 6 gives higher order term coefficients $A_4, A_6, A_8, A_{10}, A_{12}, A_{14}, A_{16}, A_{18}$ and $A_{20}$ that may be used for each of the aspherical mirror surfaces S1-S10 in Embodiment 3.

TABLE 6

| Surface number | A4 | A6 | A8 | A10 | A12 |
|---|---|---|---|---|---|
| S1 | 3.1066E−03 | 1.4995E−05 | 1.4642E−05 | −7.1013E−06 | 1.0394E−06 |
| S2 | 2.2119E−03 | 1.5488E−04 | −2.3707E−04 | 1.8983E−04 | −7.8489E−05 |
| S3 | −1.8755E−02 | 5.7990E−03 | −5.6363E−04 | −4.8636E−05 | −7.5982E−06 |
| S4 | −2.3834E−02 | 6.9938E−03 | −1.4318E−04 | −3.8188E−04 | 6.9137E−05 |
| S5 | 4.7189E−03 | −2.8334E−03 | 2.1884E−03 | −1.4591E−03 | 6.3480E−04 |
| S6 | −1.4887E−02 | 2.0864E−02 | −1.7393E−02 | 9.7646E−03 | −4.0832E−03 |
| S7 | −3.4053E−02 | 2.8382E−02 | −2.1207E−02 | 1.1769E−02 | −4.8061E−03 |
| S8 | −1.2546E−02 | 5.3204E−03 | −1.2084E−03 | −9.0793E−05 | 5.1555E−04 |
| S9 | −7.5324E−03 | 9.8351E−05 | 1.2629E−04 | −7.0277E−05 | 3.3547E−05 |
| S10 | −7.3750E−03 | −1.9509E−04 | 2.4336E−04 | −1.1956E−04 | 3.8064E−05 |

TABLE 6-continued

| Surface number | A14 | A16 | A18 | A20 |
|---|---|---|---|---|
| S1 | 1.3816E−07 | −7.1223E−08 | 6.9870E−09 | −2.0517E−10 |
| S2 | 1.6270E−05 | −1.7696E−06 | 9.6744E−08 | −2.0961E−09 |
| S3 | 9.1071E−06 | −1.6310E−06 | 1.1572E−07 | −2.9590E−09 |
| S4 | 2.1439E−06 | −7.5724E−07 | −9.5703E−08 | 1.3462E−08 |
| S5 | −2.1596E−04 | 4.7583E−05 | −5.6538E−06 | 2.7329E−07 |
| S6 | 1.1699E−03 | −2.0900E−04 | 2.0783E−05 | −8.7866E−07 |
| S7 | 1.3612E−03 | −2.4202E−04 | 2.3844E−05 | −9.8932E−07 |
| S8 | −3.4432E−04 | 1.1279E−04 | −1.8778E−05 | 1.2507E−06 |
| S9 | −1.1149E−05 | 2.3109E−06 | −2.5904E−07 | 1.1819E−08 |
| S10 | −7.8616E−06 | 9.9044E−07 | −6.6491E−08 | 1.7018E−09 |

Figure 6A:
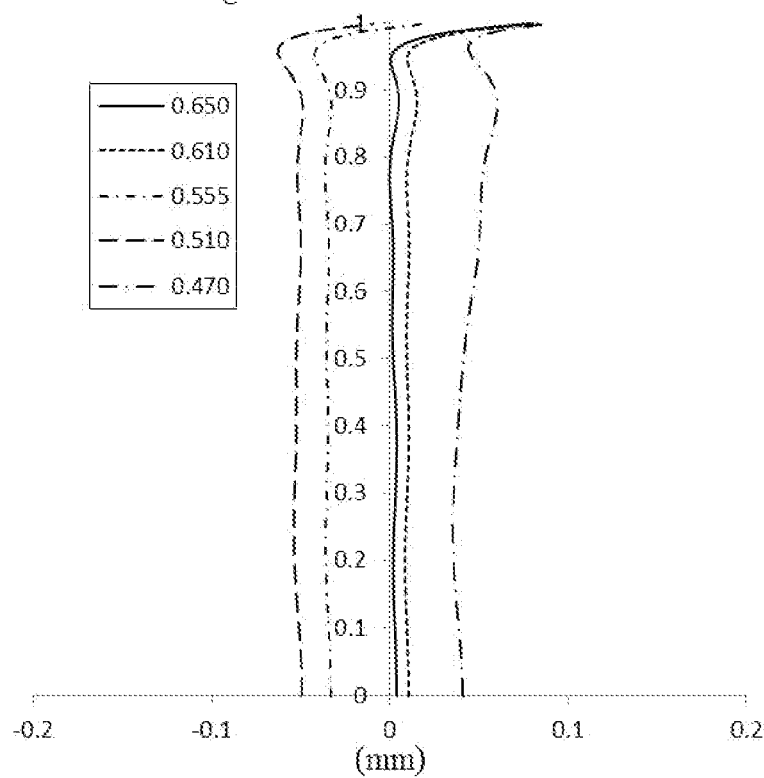
FIGS. 6A-6D show a longitudinal aberration curve, an astigmatism curve, a distortion curve and a lateral color curve of the optical imaging lens assembly in Embodiment 3 respectively.
Figure 6B:
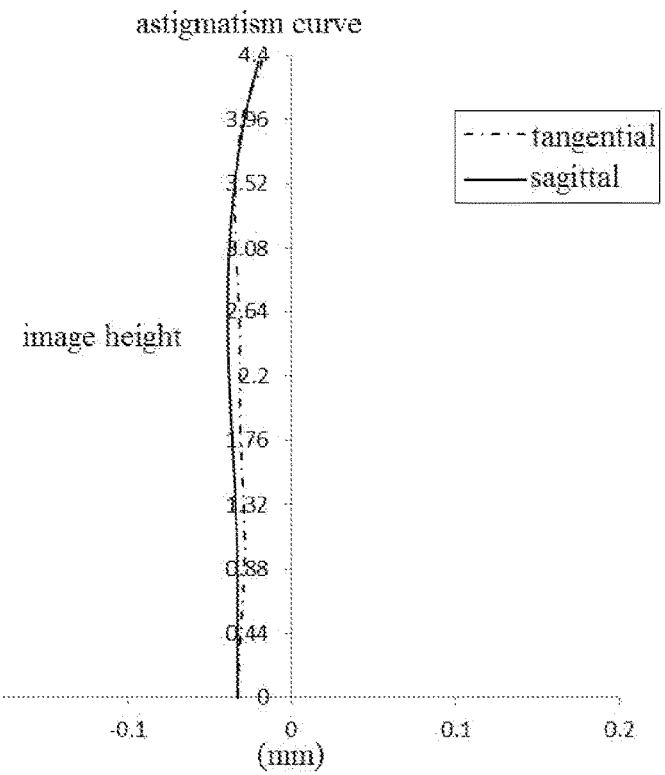
Figure 6C:
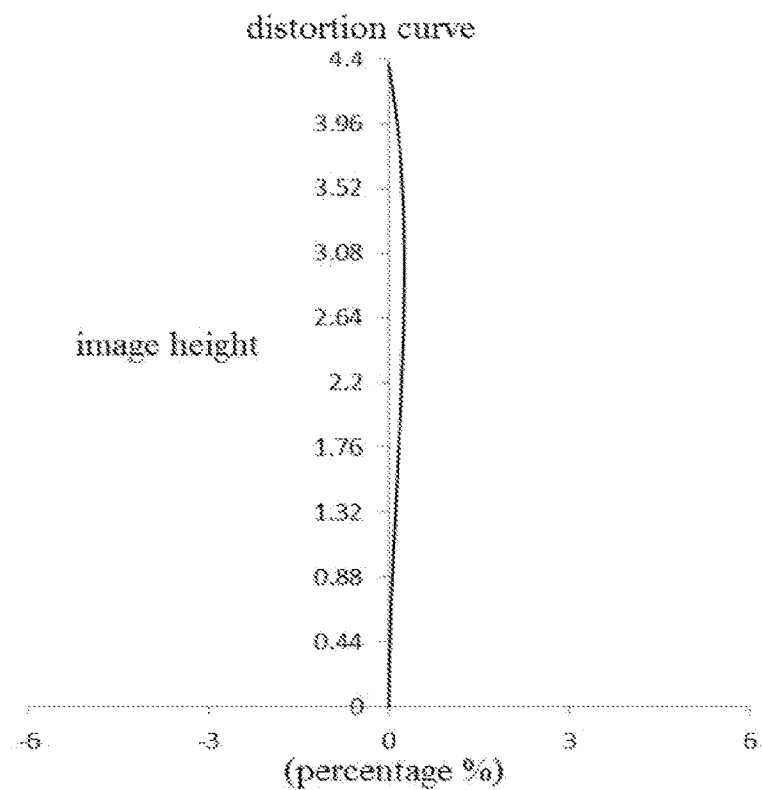
Figure 6D:
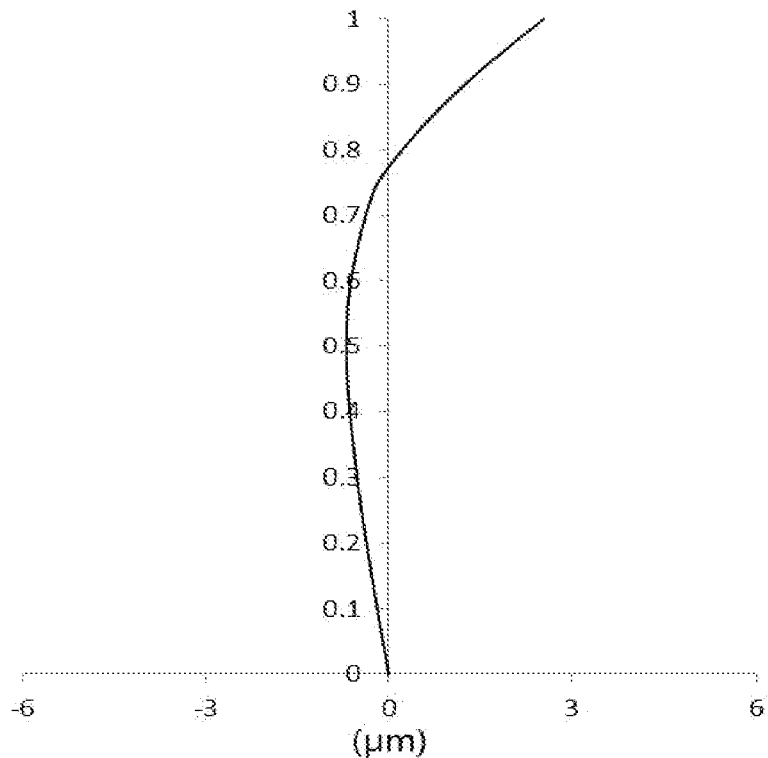

FIG. 6A shows a longitudinal aberration curve of the optical imaging lens assembly in Embodiment 3, which represents deviation of a convergence focal point after light with different wavelengths passes through the lens. FIG. 6B shows an astigmatism curve of the optical imaging lens assembly of Embodiment 3, which represents a tangential image surface curvature and a sagittal image surface curvature. FIG. 6C shows a distortion curve of the optical imaging lens assembly of Embodiment 3, which represents distortion values corresponding to different image heights. FIG. 6D shows a lateral color curve of the optical imaging lens assembly in Embodiment 3, which represents deviation of different image heights on the imaging surface after the light passes through the lens. According to FIG. 6A to FIG. 6D, it can be seen that the optical imaging lens assembly provided in Embodiment 3 achieves good imaging quality.

Embodiment 4

Figure 7:
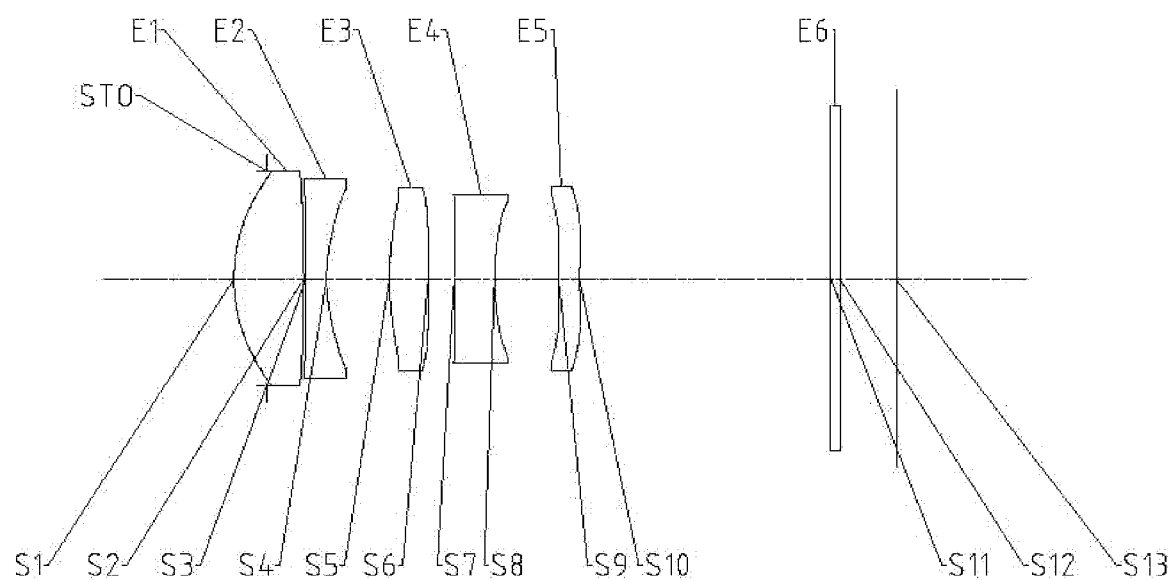
FIG. 7 shows a structural schematic diagram of an optical imaging lens assembly according to Embodiment 4 of the disclosure.

An optical imaging lens assembly according to Embodiment 4 of the disclosure is described below with reference to FIGS. 7-8D. FIG. 7 shows a structural schematic diagram of an optical imaging lens assembly according to Embodiment 4 of the disclosure.

As shown in FIG. 7, from an object side to an image side along an optical axis, the optical imaging lens assembly sequentially includes: a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The optical filter E6 is provided with an object-side surface S11 and an image-side surface S12. Light from an object sequentially passes through each of the surfaces from S1 to S12 and is finally imaged on the imaging surface S13.

In this embodiment, f, a total effective focal length of the optical imaging lens, equals 16.85 mm, TTL, a distance from an object-side surface S1 of the first lens E1 to the imaging surface S13 on the optical axis, equals 15.22 mm, and ImgH, half of a diagonal length of an effective pixel region on the imaging surface S13, equals 4.36 mm.

Table 7 shows a table of basic parameters for the optical imaging lens assembly of Embodiment 4, wherein the units of the radius of curvature, thickness, and focal length are all millimeters (mm).

TABLE 7

| Surface number | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.7377 | | | | |
| S1 | Aspherical | 3.8327 | 1.6000 | 1.54 | 56.1 | 6.43 | −1.4866 |
| S2 | Aspherical | −35.3776 | 0.0600 | | | | 99.0000 |
| S3 | Aspherical | 28.4935 | 0.4680 | 1.65 | 23.5 | −6.62 | 1.8619 |
| S4 | Aspherical | 3.6821 | 1.4440 | | | | −1.5931 |
| S5 | Aspherical | 6.4406 | 0.8920 | 1.68 | 19.2 | 10.50 | −8.4648 |
| S6 | Aspherical | 64.3339 | 0.5990 | | | | 9.0497 |
| S7 | Aspherical | 21.5204 | 0.9293 | 1.62 | 25.9 | −12.62 | 99.0000 |
| S8 | Aspherical | 5.6401 | 1.4743 | | | | 1.7790 |
| S9 | Aspherical | 13.7287 | 0.4731 | 1.54 | 56.1 | −72.21 | −99.0000 |
| S10 | Aspherical | 10.0567 | 5.7775 | | | | −56.9922 |
| S11 | Spherical | Infinity | 0.2100 | 1.52 | 64.2 | | |
| S12 | Spherical | Infinity | 1.2906 | | | | |
| S13 | Spherical | Infinity | | | | | |

In Embodiment 4, both of the object-side surface and the image-side surface of any one of the first lens E1 to the fifth lens E5 are aspherical surfaces. Table 8 gives higher order term coefficients $A_4$, $A_6$, $A_8$, $A_{10}$, $A_{12}$, $A_{14}$, $A_{16}$, $A_{18}$ and $A_{20}$ that may be used for each of the aspherical mirror surfaces S1-S10 in Embodiment 4.

TABLE 8

| Surface number | A4 | A6 | A8 | A10 | A12 |
|---|---|---|---|---|---|
| S1 | 3.4195E−03 | −6.1979E−05 | 3.1983E−05 | −4.4732E−06 | −1.7555E−06 |
| S2 | −3.3463E−03 | 5.0214E−03 | −2.3548E−03 | 7.3268E−04 | −1.7054E−04 |
| S3 | −2.6041E−02 | 1.3543E−02 | −4.7088E−03 | 1.1907E−03 | −2.2222E−04 |
| S4 | −2.5731E−02 | 1.1432E−02 | −3.6804E−03 | 9.6270E−04 | −1.9817E−04 |
| S5 | −3.3960E−03 | 1.0224E−03 | −2.8577E−04 | −3.0759E−05 | 1.9471E−05 |
| S6 | −1.3120E−02 | 5.1281E−03 | −1.5641E−03 | −8.4593E−05 | 1.8190E−04 |
| S7 | −2.2762E−02 | 1.0930E−02 | −2.6058E−03 | −8.6804E−04 | 8.6166E−04 |
| S8 | −1.8663E−02 | 1.1317E−02 | −2.9246E−03 | −3.4314E−04 | 7.9652E−04 |
| S9 | −3.8667E−02 | 5.3032E−03 | 1.1052E−03 | −1.2833E−03 | 6.5733E−04 |
| S10 | −3.2277E−02 | 5.1415E−03 | −1.7383E−04 | −3.4212E−04 | 1.7335E−04 |

| Surface number | A14 | A16 | A18 | A20 |
|---|---|---|---|---|
| S1 | 7.8515E−07 | −1.4105E−07 | 1.0593E−08 | −2.7660E−10 |
| S2 | 2.6625E−05 | −2.4944E−06 | 1.2474E−07 | −2.5459E−09 |
| S3 | 2.8861E−05 | −2.3368E−06 | 1.0262E−07 | −1.8379E−09 |
| S4 | 3.2602E−05 | −3.8534E−06 | 2.4729E−07 | −4.7979E−09 |
| S5 | −3.6521E−06 | 6.6124E−07 | −1.3768E−07 | 1.1644E−08 |
| S6 | −5.9026E−05 | 1.0392E−05 | −1.0542E−06 | 4.8452E−08 |
| S7 | −3.1513E−04 | 6.6006E−05 | −7.7156E−06 | 3.8155E−07 |
| S8 | −3.9872E−04 | 1.1123E−04 | −1.6704E−05 | 1.0432E−06 |
| S9 | −2.1272E−04 | 4.4802E−05 | −5.3336E−06 | 2.6574E−07 |
| S10 | −4.8077E−05 | 8.5477E−06 | −8.7660E−07 | 4.0231E−08 |

Figure 8A:
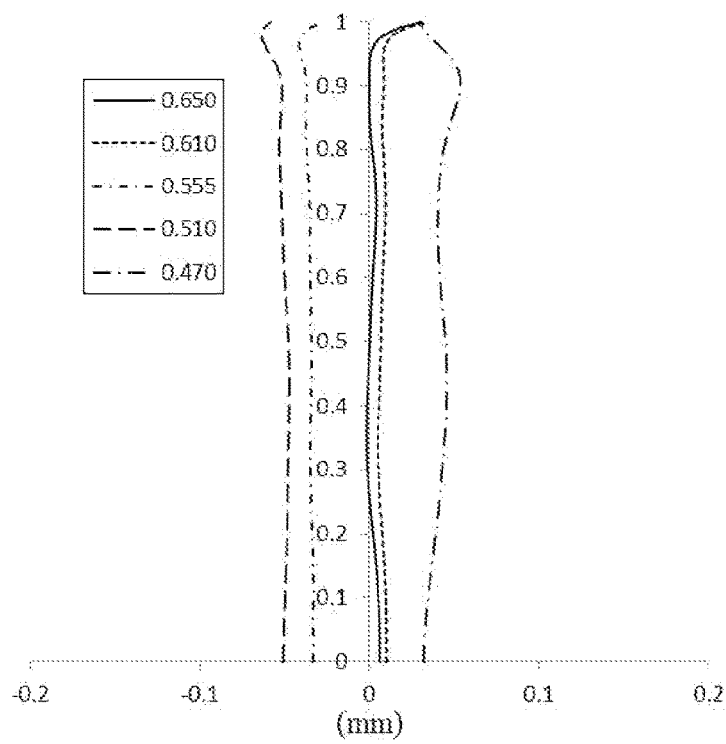
Figure 8B:
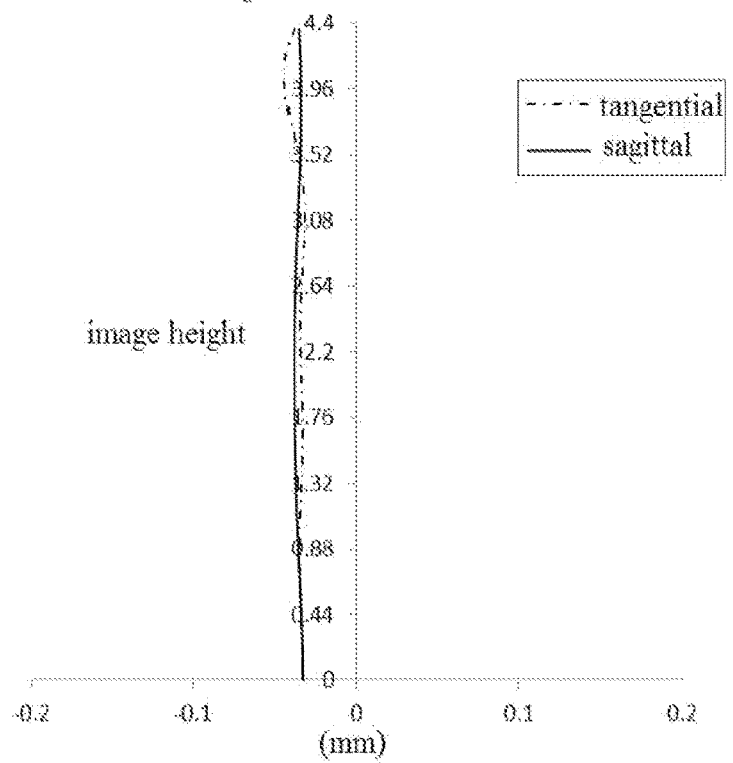

FIG. 8A shows a longitudinal aberration curve of the optical imaging lens assembly in Embodiment 4, which represents deviation of a convergence focal point after light with different wavelengths passes through the lens. FIG. 8B shows an astigmatism curve of the optical imaging lens assembly of Embodiment 4, which represents a tangential image surface curvature and a sagittal image surface curvature. FIG. 8C shows a distortion curve of the optical imaging lens assembly of Embodiment 4, which represents distortion values corresponding to different image heights. FIG. 8D shows a lateral color curve of the optical imaging lens assembly in Embodiment 4, which represents deviation of different image heights on the imaging surface after the light ray passes through the lens. According to FIG. 8A to FIG. 8D, it can be seen that the optical imaging lens assembly provided in Embodiment 4 is capable of achieving good imaging quality.

Embodiment 5

Figure 9:
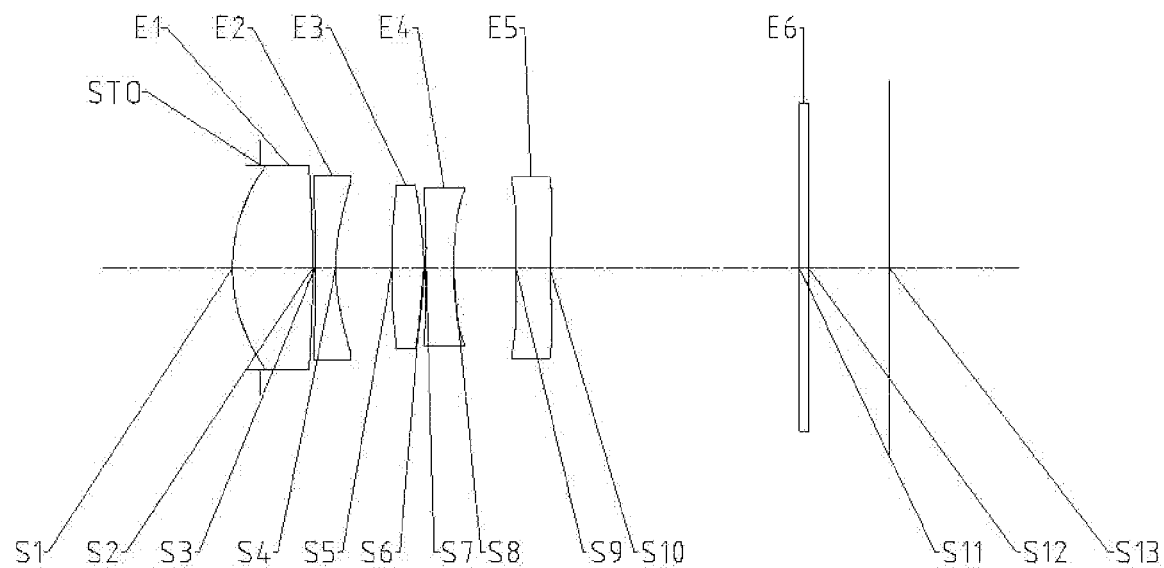
FIG. 9 shows a structural schematic diagram of an optical imaging lens assembly according to Embodiment 5 of the disclosure.

An optical imaging lens assembly according to Embodiment 5 of the disclosure is described below with reference to FIGS. 9-10D. FIG. 9 shows a structural schematic diagram of an optical imaging lens assembly according to Embodiment 5 of the disclosure.

As shown in FIG. 9, from an object side to an image side along an optical axis, the optical imaging lens assembly sequentially includes: a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The first lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The optical filter E6 is provided with an object-side surface S11 and an image-side surface S12. Light from an object sequentially passes through each of the surfaces from S1 to S12 and is finally imaged on the imaging surface S13.

In this embodiment, f, a total effective focal length of the optical imaging lens assembly, equals 16.81 mm, TTL, a distance from an object-side surface S1 of the first lens E1 to the imaging surface S13 on the optical axis, equals 15.21 mm, and ImgH, half of a diagonal length of an effective pixel region on the imaging surface S13, equals 4.35 mm.

Table 9 shows a table of basic parameters for the optical imaging lens assembly of Embodiment 5, wherein the units of the radius of curvature, thickness, and focal length are all millimeters (mm).

TABLE 9

| Surface number | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.6380 | | | | |
| S1 | Aspherical | 3.8944 | 1.8609 | 1.54 | 56.1 | 6.32 | −2.3285 |
| S2 | Aspherical | −25.0866 | 0.0501 | | | | 95.1422 |
| S3 | Aspherical | 33.3926 | 0.4840 | 1.65 | 23.5 | −7.57 | 1.8622 |
| S4 | Aspherical | 4.2292 | 1.3054 | | | | −0.9951 |
| S5 | Aspherical | 80.1493 | 0.7300 | 1.68 | 19.2 | 9.98 | 72.8690 |
| S6 | Aspherical | −7.3593 | 0.0501 | | | | −16.3750 |
| S7 | Aspherical | 20.1158 | 0.6300 | 1.62 | 25.9 | −11.17 | 99.0000 |
| S8 | Aspherical | 5.0878 | 1.4552 | | | | −1.5936 |
| S9 | Aspherical | 17.8764 | 0.7843 | 1.54 | 56.1 | −38.35 | −98.9965 |
| S10 | Aspherical | 9.4903 | 5.7744 | | | | −35.4569 |
| S11 | Spherical | Infinity | 0.2100 | 1.52 | 64.2 | | |
| S12 | Spherical | Infinity | 1.8738 | | | | |
| S13 | Spherical | Infinity | | | | | |

In Embodiment 5, both of the object-side surface and the image-side surface of any one of the first lens E1 to the fifth lens E5 are aspherical surfaces. Table 10 gives higher order term coefficients $A_4$, $A_6$, $A_8$, $A_{10}$, $A_{12}$, $A_{14}$, $A_{16}$, $A_{18}$ and $A_{20}$ that may be used for each of the aspherical mirror surfaces S1-S10 in Embodiment 5.

TABLE 10

| Surface number | A4 | A6 | A8 | A10 | A12 |
|---|---|---|---|---|---|
| S1 | 5.2753E−03 | −4.0545E−04 | 5.4858E−04 | −6.7237E−04 | 5.6034E−04 |
| S2 | −5.4900E−03 | 1.0187E−02 | 2.1090E−03 | −1.2300E−02 | 1.1031E−02 |
| S3 | −2.7770E−02 | 1.6179E−02 | 6.6100E−03 | −2.1042E−02 | 1.8154E−02 |
| S4 | −2.4921E−02 | 9.5525E−03 | 6.8707E−03 | −1.5134E−02 | 1.2502E−02 |
| S5 | 9.9799E−03 | −3.6445E−04 | 6.7948E−03 | −5.0044E−03 | −5.5391E−03 |
| S6 | −3.5598E−02 | 6.3183E−02 | −2.6755E−02 | −6.1125E−03 | −1.6359E−02 |
| S7 | −7.8109E−02 | 6.9016E−02 | 1.1850E−03 | −6.4574E−02 | 4.3986E−02 |
| S8 | −3.6251E−02 | 1.2283E−02 | 4.8100E−04 | 3.0714E−02 | −1.0318E−01 |
| S9 | −1.9511E−02 | −1.8472E−04 | 7.0393E−03 | −1.7204E−02 | 2.8734E−02 |
| S10 | −1.4339E−02 | 3.5263E−03 | −5.6368E−03 | 6.5929E−03 | −3.9138E−03 |

| Surface number | A14 | A16 | A18 | A20 |
|---|---|---|---|---|
| S1 | −3.3741E−04 | 1.5070E−04 | −5.0299E−05 | 1.2464E−05 |
| S2 | −5.3373E−03 | 1.6467E−03 | −3.4412E−04 | 4.9842E−05 |
| S3 | −8.9391E−03 | 2.8762E−03 | −6.3676E−04 | 9.8950E−05 |
| S4 | −6.0761E−03 | 1.8450E−03 | −3.2626E−04 | 1.8428E−05 |
| S5 | 1.1525E−02 | −9.2981E−03 | 4.4968E−03 | −1.4344E−03 |
| S6 | 5.2578E−02 | −5.5175E−02 | 3.2823E−02 | −1.2556E−02 |
| S7 | 1.9470E−02 | −4.8731E−02 | 3.6465E−02 | −1.5809E−02 |
| S8 | 1.6335E−01 | −1.5972E−01 | 1.0535E−01 | −4.8505E−02 |
| S9 | −3.2165E−02 | 2.4774E−02 | −1.3378E−02 | 5.1004E−03 |
| S10 | 4.6145E−04 | 1.0674E−03 | −9.0752E−04 | 3.8642E−04 |

Figure 10A:
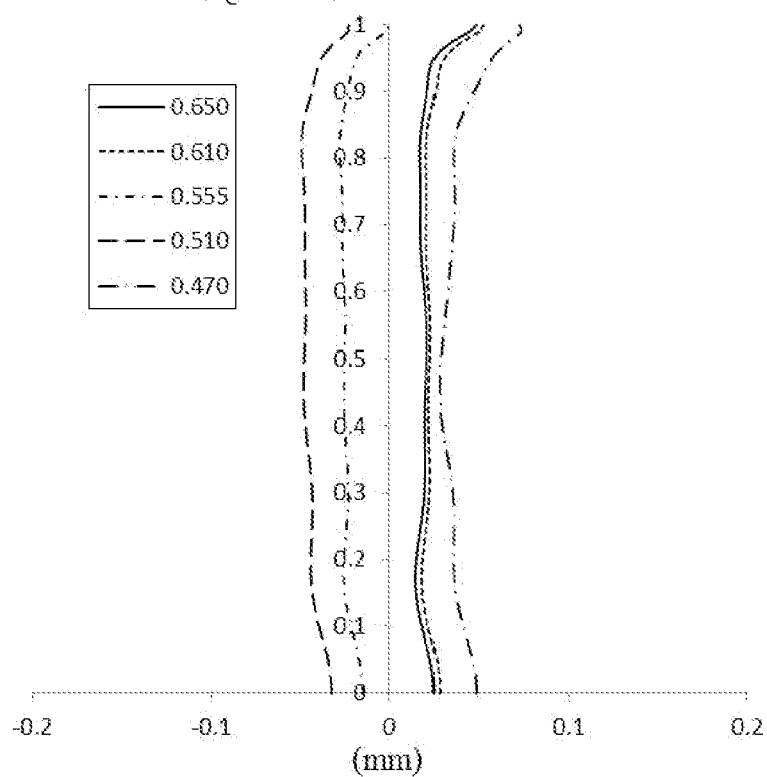
FIGS. 10A-10D show a longitudinal aberration curve, an astigmatism curve, a distortion curve and a lateral color curve of the optical imaging lens assembly in Embodiment 5 respectively.
Figure 10B:
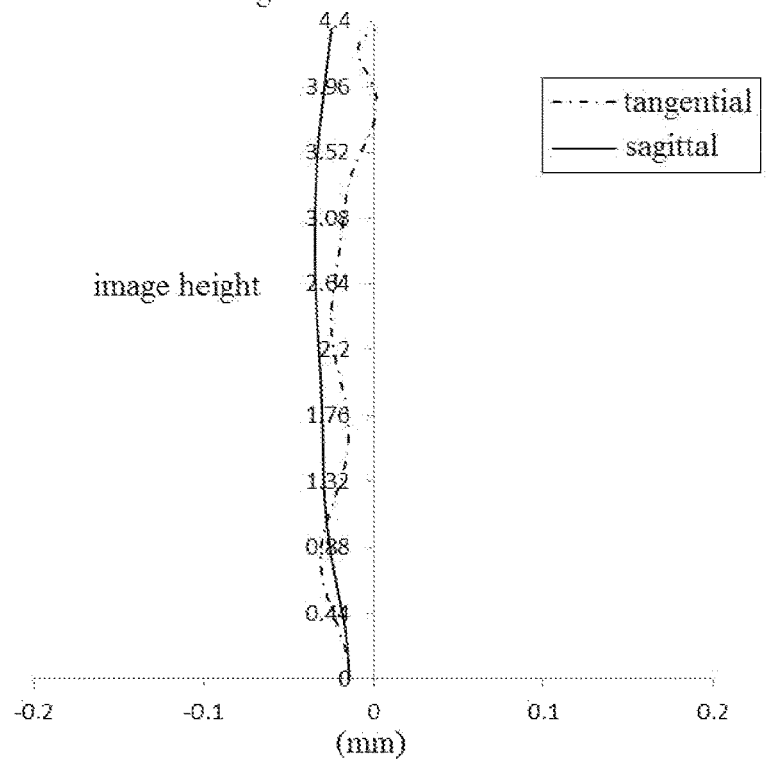
Figure 10C:
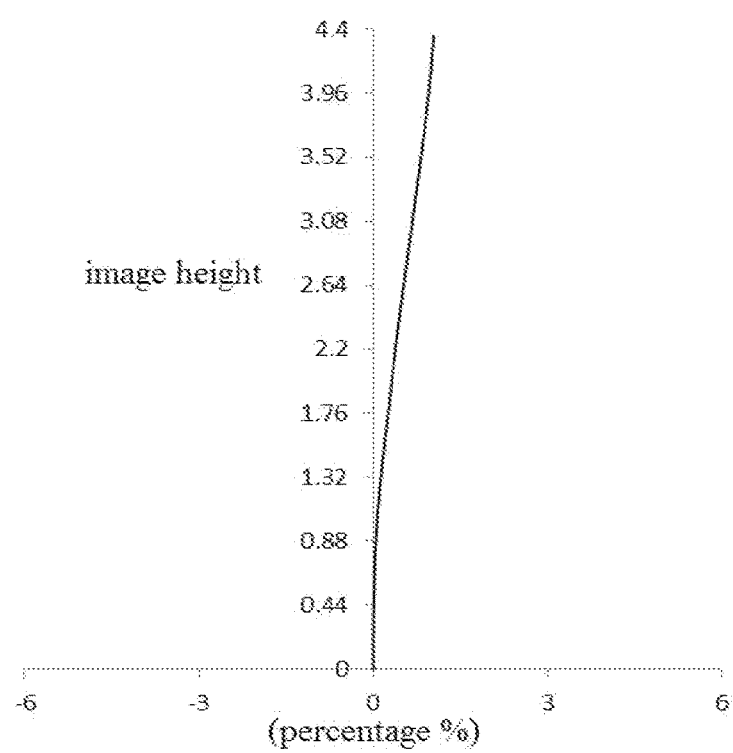
Figure 10D:
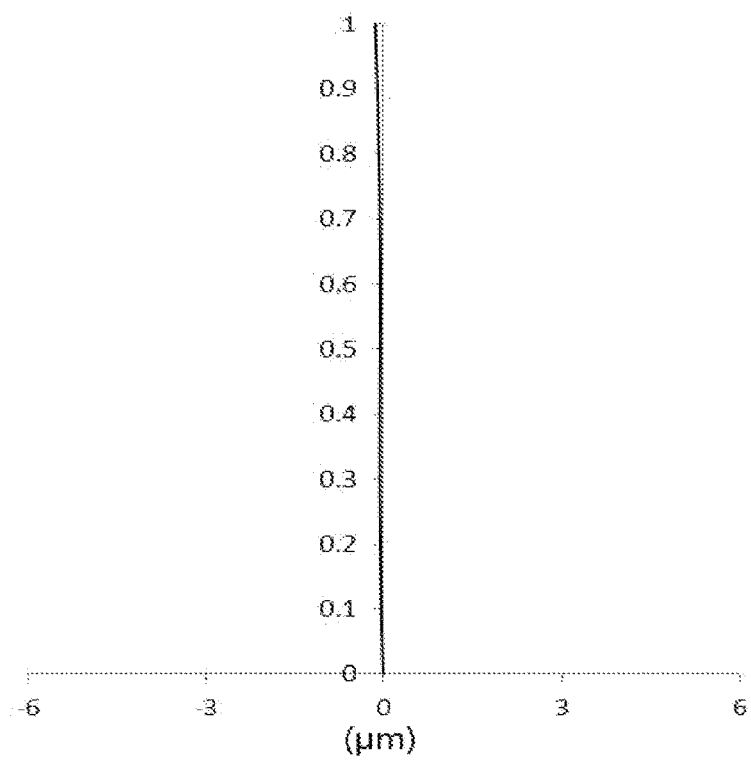

FIG. 10A shows a longitudinal aberration curve of the optical imaging lens assembly in Embodiment 5, which represents deviation of a convergence focal point after light with different wavelengths passes through the lens. FIG. 10B shows an astigmatism curve of the optical imaging lens assembly ++ of Embodiment 5, which represents a tangential image surface curvature and a sagittal image surface curvature. FIG. 10C shows a distortion curve of the optical imaging lens assembly of Embodiment 5, which represents distortion values corresponding to different image heights. FIG. 10D shows a lateral color curve of the optical imaging lens assembly in Embodiment 5, which represents deviation of different image heights on the imaging surface after the light passes through the lens. According to FIG. 10A to FIG. 10D, it can be seen that the optical imaging lens assembly provided in Embodiment 5 achieves good imaging quality.

Embodiment 6

Figure 11:
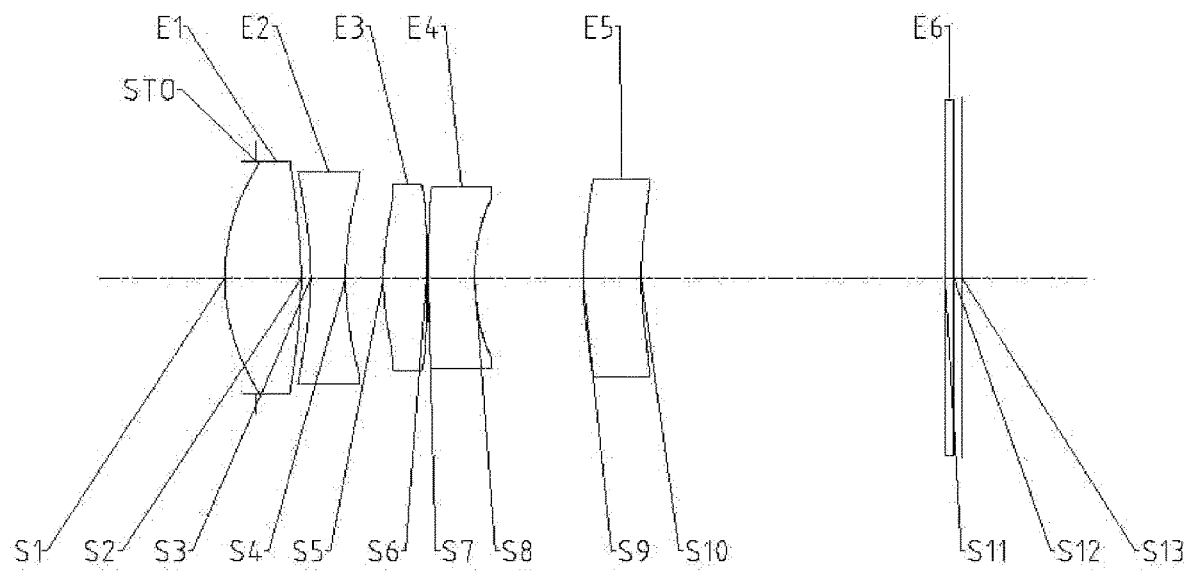
FIG. 11 shows a structural schematic diagram of an optical imaging lens assembly according to Embodiment 6 of the disclosure.

An optical imaging lens assembly according to Embodiment 6 of the disclosure is described below with reference to FIGS. 11-12D. FIG. 11 shows a structural schematic diagram of an optical imaging lens assembly according to Embodiment 6 of the disclosure.

As shown in FIG. 11, from an object side to an image side along an optical axis, the optical imaging lens assembly sequentially includes: a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, and an image-side surface S2 thereof is a convex surface. The second lens E2 has a negative refractive power, an object-side surface S3 thereof is a concave surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a concave surface. The optical filter E6 is provided with an object-side surface S11 and an image-side surface S12. Light from an object sequentially passes through each of the surfaces from S1 to S12 and is finally imaged on the imaging surface S13.

In this embodiment, f, a total effective focal length of the optical imaging lens assembly, equals 18.56 mm; TTL, a distance from an object-side surface S1 of the first lens E1 to the imaging surface S13 on the optical axis, equals 17.74 mm, and ImgH, half of a diagonal length of an effective pixel region on the imaging surface S13, equals 4.36 mm.

Table 11 shows a table of basic parameters for the optical imaging lens assembly of Embodiment 6, wherein the units of the radius of curvature, thickness, and focal length are all millimeters (mm).

TABLE 11

| Surface number | Surface type | Radius of curvature | Thickness/distance | Material Refractive index | Material Abbe number | Focal length | Conic coefficient |
|---|---|---|---|---|---|---|---|
| OBJ | Spherical | Infinity | Infinity | | | | |
| STO | Spherical | Infinity | −0.7380 | | | | |
| S1 | Aspherical | 4.8780 | 1.8500 | 1.54 | 56.1 | 6.27 | −0.6998 |
| S2 | Aspherical | −9.9218 | 0.2326 | | | | −9.0931 |
| S3 | Aspherical | −8.1330 | 0.8318 | 1.62 | 25.9 | −5.71 | −22.1313 |
| S4 | Aspherical | 6.4950 | 0.9106 | | | | −1.9316 |
| S5 | Aspherical | 6.3969 | 1.0300 | 1.68 | 19.2 | 9.44 | −6.6794 |
| S6 | Aspherical | 32276.6923 | 0.0400 | | | | 5.6702 |
| S7 | Aspherical | 22.1325 | 1.1200 | 1.62 | 25.9 | −10.61 | 58.6189 |
| S8 | Aspherical | 4.9694 | 2.6077 | | | | 1.1419 |
| S9 | Aspherical | 7.2348 | 1.4000 | 1.54 | 56.1 | 97.28 | −3.8374 |
| S10 | Aspherical | 7.8046 | 7.3054 | | | | −57.5173 |
| S11 | Spherical | Infinity | 0.2100 | 1.52 | 64.2 | | |
| S12 | Spherical | Infinity | 0.2006 | | | | |
| S13 | Spherical | Infinity | | | | | |

In Embodiment 6, both of the object-side surface and the image-side surface of any one of the first lens E1 to the fifth lens E5 are aspherical surfaces. Table 12 gives higher order term coefficients $A_4$, $A_6$, $A_8$, $A_{10}$, $A_{12}$, $A_{14}$, $A_{16}$, $A_{18}$ and $A_{20}$ that may be used for each of the aspherical mirror surfaces S1-S10 in Embodiment 6.

TABLE 12

| Surface number | A4 | A6 | A8 | A10 | A12 |
|---|---|---|---|---|---|
| S1 | 6.9110E−04 | 7.6124E−06 | 2.8876E−06 | −5.1260E−06 | 1.6496E−06 |
| S2 | 2.9203E−03 | −2.0154E−04 | −9.1318E−05 | 7.4141E−05 | −2.7765E−05 |
| S3 | −5.0394E−03 | 1.7772E−03 | −1.3894E−04 | −1.8143E−05 | −3.1150E−06 |
| S4 | −9.1556E−03 | 9.4950E−04 | 1.1025E−03 | −6.4408E−04 | 2.2215E−04 |
| S5 | 7.4071E−04 | −3.4130E−03 | 1.5151E−03 | −4.2298E−04 | 1.4506E−04 |
| S6 | 7.4108E−03 | −2.1254E−02 | 1.5771E−02 | −5.5133E−03 | 7.0482E−04 |
| S7 | −8.1417E−04 | −1.7069E−02 | 1.5708E−02 | −5.8199E−03 | 7.1505E−04 |
| S8 | −9.3490E−03 | 4.2649E−03 | −6.3320E−04 | −1.4359E−05 | 4.6114E−05 |
| S9 | −6.8737E−03 | 6.7877E−04 | −8.0045E−05 | 5.2168E−05 | −1.9357E−05 |
| S10 | 7.3230E−03 | −5.7929E−03 | 2.7688E−03 | −1.0268E−03 | 2.8326E−04 |

| Surface number | A14 | A16 | A18 | A20 |
|---|---|---|---|---|
| S1 | −2.8878E−07 | 2.6193E−08 | −1.1347E−09 | 1.8280E−11 |
| S2 | 5.3040E−06 | −5.4109E−07 | 2.8244E−08 | −5.9362E−10 |
| S3 | 2.3015E−06 | −3.5155E−07 | 2.2352E−08 | −5.2368E−10 |
| S4 | −5.7007E−05 | 9.9326E−06 | −1.0015E−06 | 4.3149E−08 |
| S5 | −6.0992E−05 | 1.5931E−05 | −2.1105E−06 | 1.1043E−07 |
| S6 | 1.1047E−04 | −5.0394E−05 | 6.4895E−06 | −2.9757E−07 |
| S7 | 1.6050E−04 | −6.7861E−05 | 8.9115E−06 | −4.2246E−07 |
| S8 | −1.3987E−05 | 2.4892E−06 | −3.0609E−07 | 1.9472E−08 |
| S9 | 4.0276E−06 | −4.3924E−07 | 1.9707E−08 | −3.4246E−11 |
| S10 | −5.4415E−05 | 6.7887E−06 | −4.9048E−07 | 1.5498E−08 |

Figure 12A:
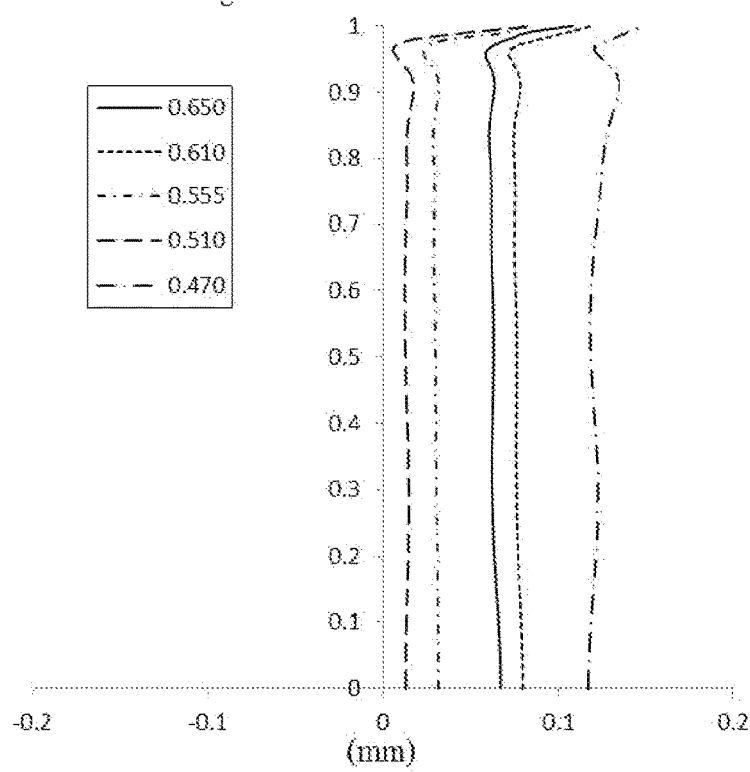
FIGS. 12A-12D show a longitudinal aberration curve, an astigmatism curve, a distortion curve and a lateral color curve of the optical imaging lens assembly in Embodiment 6 respectively.
Figure 12B:
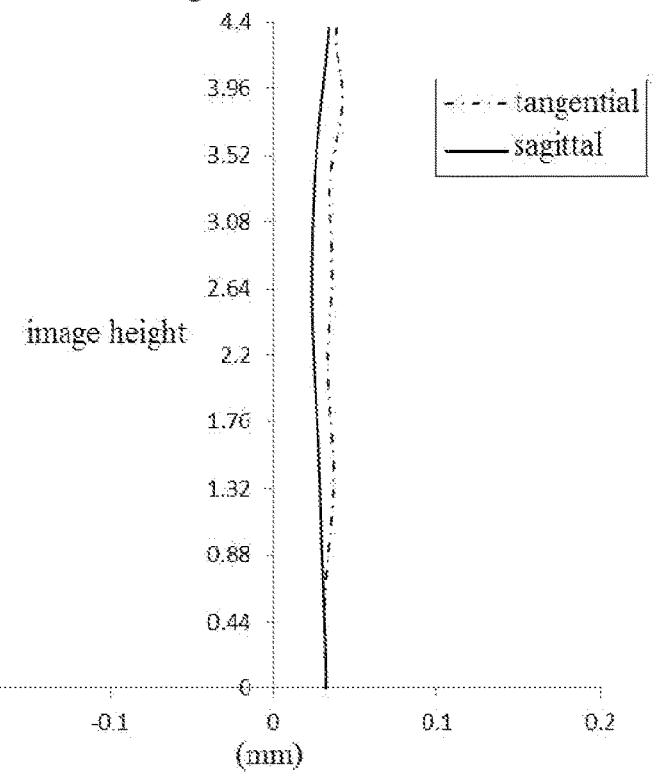
Figure 12C:
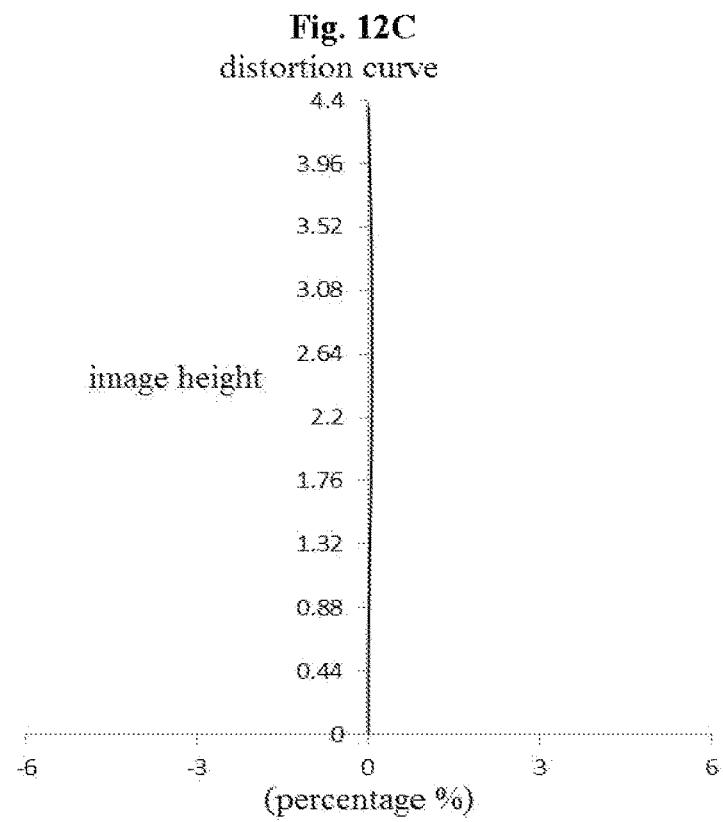
Figure 12D:
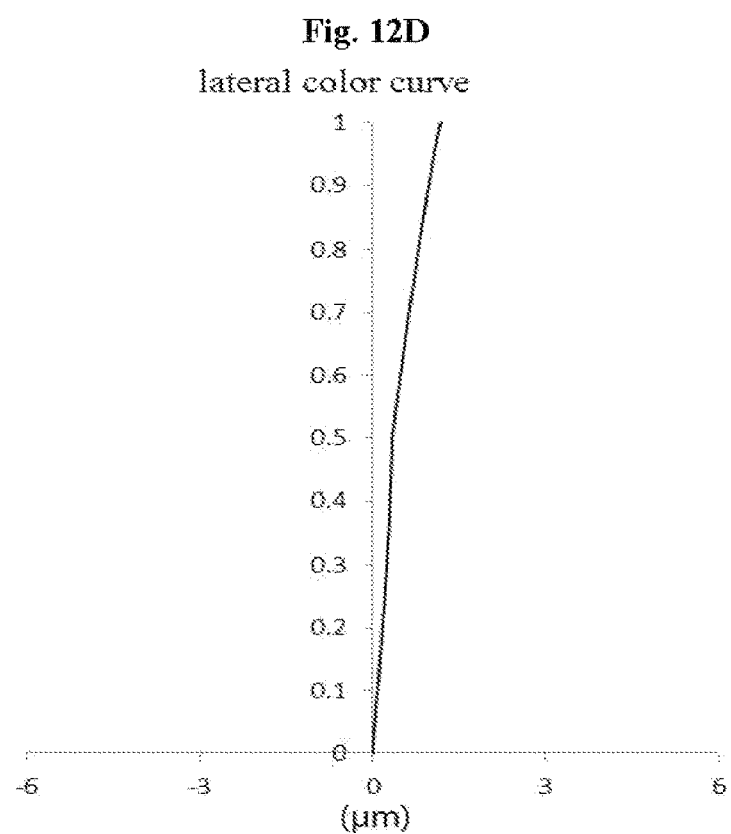

FIG. 12A shows a longitudinal aberration curve of the optical imaging lens assembly in Embodiment 6, which represents deviation of a convergence focal point after light with different wavelengths passes through the lens. FIG. 12B shows an astigmatism curve of the optical imaging lens assembly of Embodiment 6, which represents a tangential image surface curvature and a sagittal image surface curvature. FIG. 12C shows a distortion curve of the optical imaging lens assembly of Embodiment 6, which represents distortion values corresponding to different image heights. FIG. 12D shows a lateral color curve of the optical imaging lens assembly in Embodiment 6, which represents deviation of different image heights on the imaging surface after the light passes through the lens. According to FIG. 12A to FIG. 12D, it can be seen that the optical imaging lens assembly provided in Embodiment 6 achieves good imaging quality.

Embodiment 7

Figure 13:
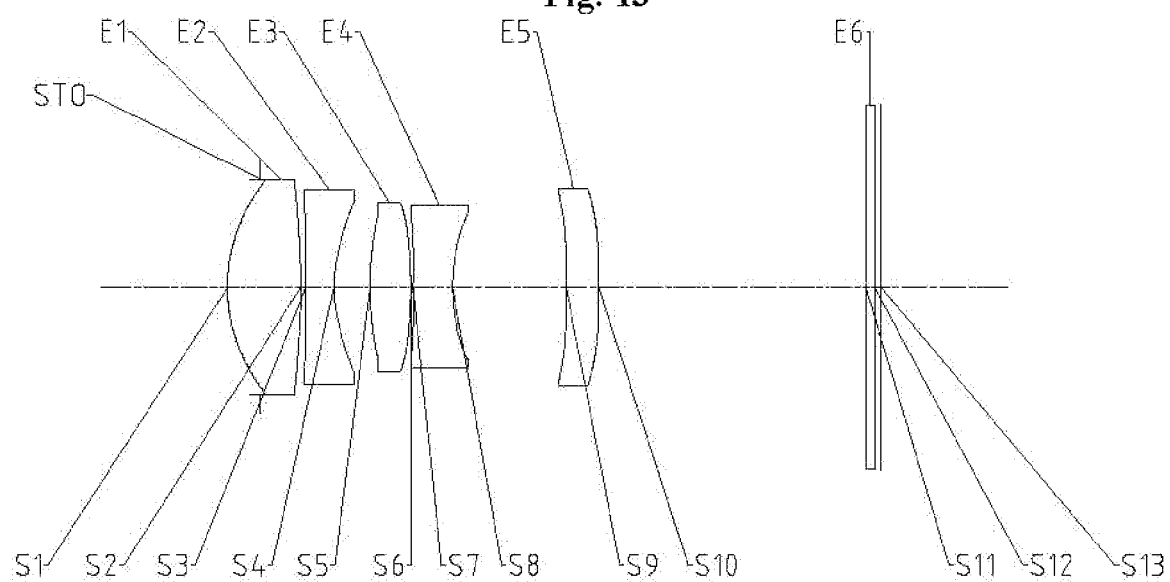
FIG. 13 shows a structural schematic diagram of an optical imaging lens assembly according to Embodiment 7 of the disclosure.

An optical imaging lens assembly according to Embodiment 7 of the disclosure is described below with reference to FIGS. 13-14D. FIG. 13 shows a structural schematic diagram of an optical imaging lens assembly according to Embodiment 7 of the disclosure.

As shown in FIG. 13, from an object side to an image side along an optical axis, the optical imaging lens assembly sequentially includes: a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 of the first lens is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The optical filter E6 is provided with an object-side surface S11 and an image-side surface S12. Light from an object sequentially passes through each of the surfaces S1 to S12 and is finally imaged on the imaging surface S13.

In this embodiment, f, a total effective focal length of the optical imaging lens assembly, equals 16.86 mm, TTL, a distance from an object-side surface S1 of the first lens E1 to the imaging surface S13 on the optical axis, equals 15.52 mm, and ImgH, half of a diagonal length of an effective pixel region on the imaging surface S13, equals 4.36 mm.

Table 13 shows a table of basic parameters for the optical imaging lens assembly of Embodiment 7, wherein the units of the radius of curvature, thickness, and focal length are all millimeters (mm).

TABLE 13

| Surface number | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.7685 | | | | |
| S1 | Aspherical | 4.0252 | 1.7300 | 1.54 | 56.1 | 6.11 | −1.3813 |
| S2 | Aspherical | −16.3731 | 0.1237 | | | | 17.0941 |
| S3 | Aspherical | 15.1518 | 0.6684 | 1.65 | 23.5 | −5.80 | 1.8619 |
| S4 | Aspherical | 2.9423 | 0.8580 | | | | −2.1517 |
| S5 | Aspherical | 8.9183 | 0.9626 | 1.68 | 19.2 | 7.64 | −5.8228 |
| S6 | Aspherical | −11.7933 | 0.0555 | | | | 2.2754 |
| S7 | Aspherical | 22.0462 | 0.9400 | 1.62 | 25.9 | −7.92 | 99.0000 |
| S8 | Aspherical | 3.9472 | 2.6963 | | | | 0.1033 |
| S9 | Aspherical | −120.9721 | 0.7755 | 1.54 | 56.1 | 148.51 | 98.1265 |
| S10 | Aspherical | −48.6299 | 6.3389 | | | | 50.8881 |
| S11 | Spherical | Infinity | 0.2100 | 1.52 | 64.2 | | |
| S12 | Spherical | Infinity | 0.1582 | | | | |
| S13 | Spherical | Infinity | | | | | |

In Embodiment 7, both of the object-side surface and the image-side surface of any one of the first lens E1 to the fifth lens E5 are aspherical surfaces. Table 14 below gives higher order term coefficients $A_4$, $A_6$, $A_8$, $A_{10}$, $A_{12}$, $A_{14}$, $A_{16}$, $A_{18}$ and $A_{20}$ that may be used for each of the aspherical mirror surfaces S1-S10 in Embodiment 7.

TABLE 14

| Surface number | A4 | A6 | A8 | A10 | A12 |
|---|---|---|---|---|---|
| S1 | 3.3090E−03 | 4.6118E−05 | −1.6486E−05 | 9.3443E−06 | −4.6250E−06 |
| S2 | 1.6692E−03 | 1.3507E−03 | −1.1495E−03 | 5.6532E−04 | −1.6452E−04 |
| S3 | −2.4699E−02 | 5.7528E−03 | −1.0657E−03 | 4.1707E−04 | −1.5631E−04 |
| S4 | −2.3409E−02 | 4.2504E−03 | 8.9034E−04 | −7.3990E−04 | 2.6834E−04 |
| S5 | 1.0702E−02 | −4.9118E−03 | 2.7356E−03 | −1.9038E−03 | 9.2644E−04 |
| S6 | −9.0421E−03 | 1.8551E−02 | −1.6865E−02 | 9.1819E−03 | −3.4743E−03 |
| S7 | −4.0300E−02 | 2.9805E−02 | −2.1547E−02 | 1.1572E−02 | −4.3460E−03 |
| S8 | −2.0635E−02 | 9.7976E−03 | −3.1088E−03 | 1.0057E−03 | −7.5709E−05 |
| S9 | −9.8087E−03 | 1.8594E−04 | 5.5977E−04 | −3.9942E−04 | 1.8501E−04 |
| S10 | −9.1871E−03 | 1.5843E−04 | 2.6404E−04 | −1.5928E−04 | 5.7888E−05 |

| Surface number | A14 | A16 | A18 | A20 |
|---|---|---|---|---|
| S1 | 1.2922E−06 | −1.9877E−07 | 1.3942E−08 | −3.5143E−10 |
| S2 | 2.7650E−05 | −2.6310E−06 | 1.3115E−07 | −2.6540E−09 |
| S3 | 3.3048E−05 | −3.7185E−06 | 2.0988E−07 | −4.6844E−09 |
| S4 | −7.2961E−05 | 1.4269E−05 | −1.6003E−06 | 7.3184E−08 |
| S5 | −3.0772E−04 | 6.2016E−05 | −6.7449E−06 | 3.0436E−07 |
| S6 | 8.7141E−04 | −1.3387E−04 | 1.1195E−05 | −3.8322E−07 |
| S7 | 1.0846E−03 | −1.6487E−04 | 1.3356E−05 | −4.2601E−07 |
| S8 | −1.0153E−04 | 4.7415E−05 | −8.6751E−06 | 5.8200E−07 |
| S9 | −5.3618E−05 | 9.5158E−06 | −9.3896E−07 | 3.9304E−08 |
| S10 | −1.3148E−05 | 1.8252E−06 | −1.3972E−07 | 4.4979E−09 |

Figure 14A:
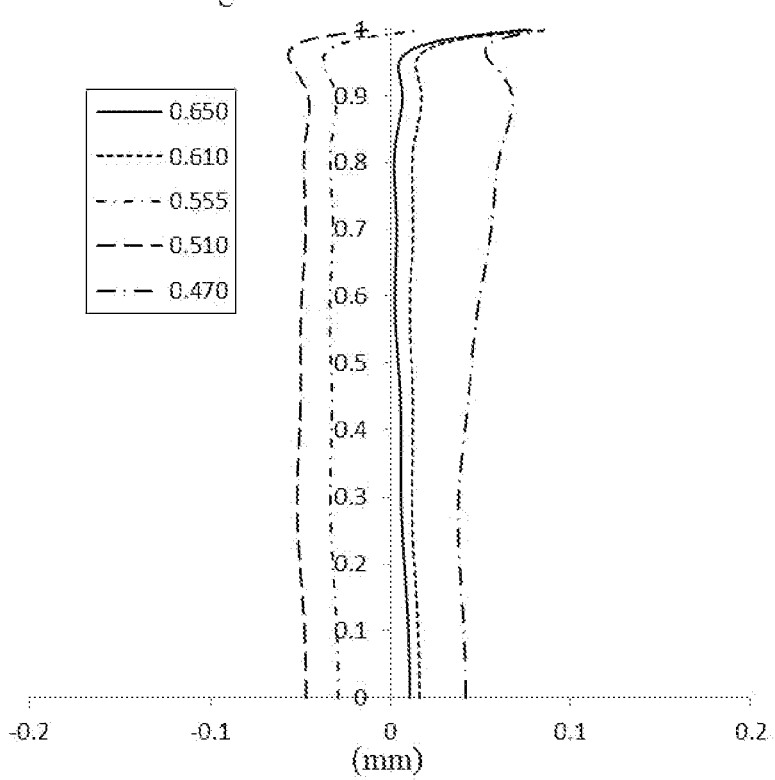
Figure 14D:
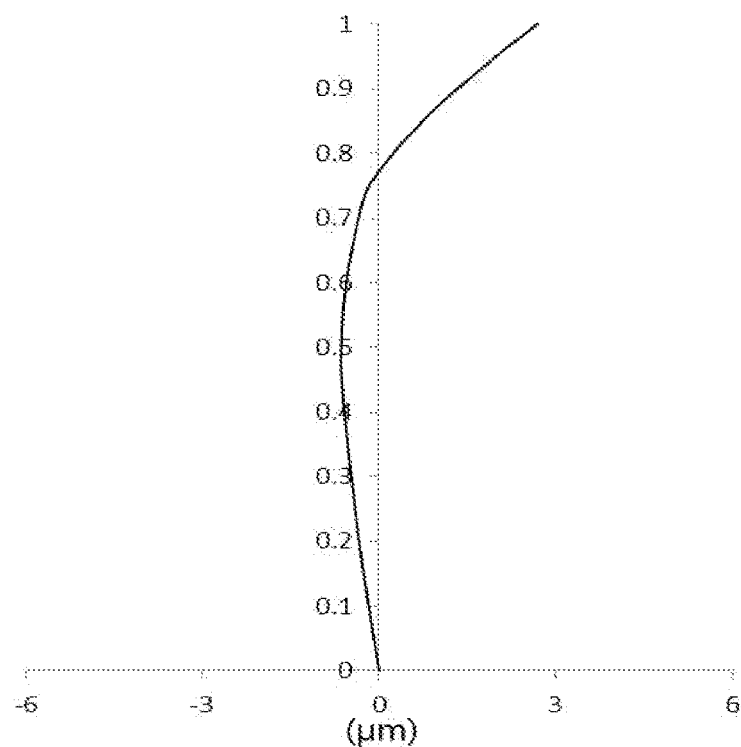

FIG. 14A shows a longitudinal aberration curve of the optical imaging lens assembly in Embodiment 7, which represents deviation of a convergence focal point after light with different wavelengths passes through the lens. FIG. 14B shows an astigmatism curve of the optical imaging lens assembly of Embodiment 7, which represents a tangential image surface curvature and a sagittal image surface curvature. FIG. 14C shows a distortion curve of the optical imaging lens assembly of Embodiment 7, which represents distortion values corresponding to different image heights. FIG. 14D shows a lateral color curve of the optical imaging lens assembly in Embodiment 7, which represents deviation of different image heights on the imaging surface after the light ray passes through the lens. According to FIG. 14A to FIG. 14D, it can be seen that the optical imaging lens assembly provided in Embodiment 7 achieves good imaging quality.

Embodiment 8

Figure 15:
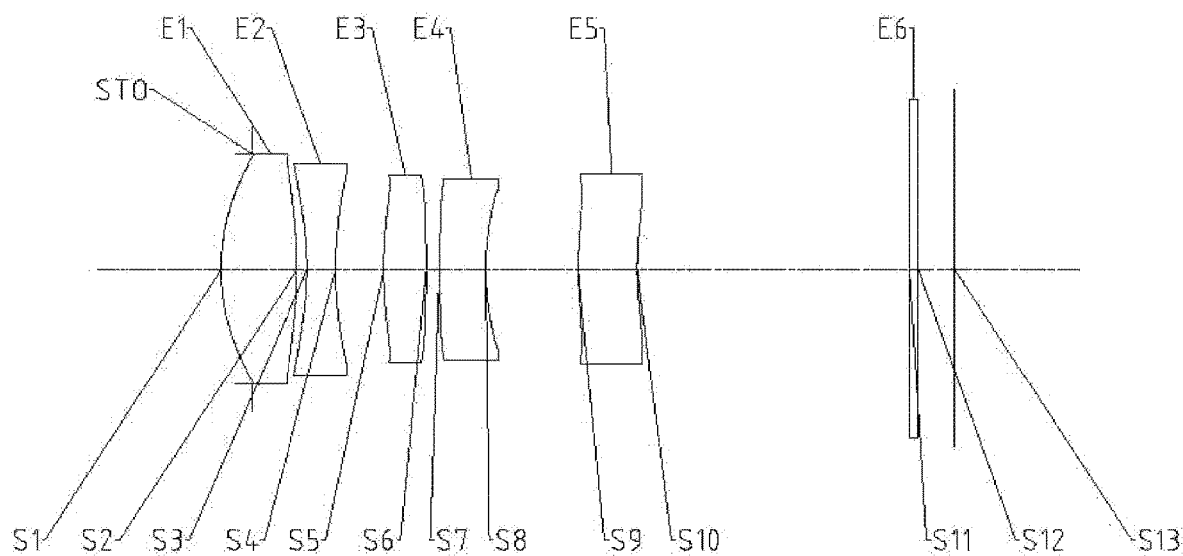
FIG. 15 shows a structural schematic diagram of an optical imaging lens assembly according to Embodiment 8 of the disclosure.

An optical imaging lens assembly according to Embodiment 8 of the disclosure is described below with reference to FIGS. 15-16D. FIG. 15 shows a structural schematic diagram of an optical imaging lens according to Embodiment 7 of the disclosure.

As shown in FIG. 15, from an object side to an image side along an optical axis, the optical imaging lens assembly sequentially includes: a diaphragm STO, a first lens E1, a second lens E2, a third lens E3, a fourth lens E4, a fifth lens E5, an optical filter E6 and an imaging surface S13.

The first lens E1 has a positive refractive power, an object-side surface S1 thereof is a convex surface, and an image-side surface S2 thereof is a convex surface. The second lens E2 has a negative refractive power, an object-side surface S3 thereof is a concave surface, and an image-side surface S4 thereof is a concave surface. The first lens E3 has a positive refractive power, an object-side surface S5 thereof is a convex surface, and an image-side surface S6 thereof is a convex surface. The fourth lens E4 has a negative refractive power, an object-side surface S7 thereof is a convex surface, and an image-side surface S8 thereof is a concave surface. The fifth lens E5 has a negative refractive power, an object-side surface S9 thereof is a convex surface, and an image-side surface S10 thereof is a concave surface. The optical filter E6 is provided with an object-side surface S11 and an image-side surface S12. Light from an object sequentially passes through each of the surfaces S1 to S12 and is finally imaged on the imaging surface S13.

In this embodiment, f, a total effective focal length of the optical imaging lens assembly, equals 18.56 mm, TTL, a distance from an object-side surface S1 of the first lens E1 to the imaging surface S13 on the optical axis, equals 17.81 mm, and ImgH, half of a diagonal length of an effective pixel region on the imaging surface S13, equals 4.36 mm.

Table 15 shows a table of basic parameters for the optical imaging lens assembly of Embodiment 8, wherein the units of the radius of curvature, thickness, and focal length are all millimeters (mm).

TABLE 15

| Surface number | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.7380 | | | | |
| S1 | Aspherical | 5.1643 | 1.8500 | 1.54 | 56.1 | 6.48 | −0.7838 |
| S2 | Aspherical | −9.7986 | 0.2433 | | | | −9.4323 |
| S3 | Aspherical | −7.7060 | 0.6936 | 1.65 | 25.9 | −6.47 | −21.7598 |
| S4 | Aspherical | 8.6339 | 1.1643 | | | | −0.5466 |
| S5 | Aspherical | 10.4976 | 1.0300 | 1.68 | 19.2 | 11.77 | −5.6213 |
| S6 | Aspherical | −31.8193 | 0.3205 | | | | 5.6702 |
| S7 | Aspherical | 22.7633 | 1.1200 | 1.62 | 25.9 | −13.88 | 93.9364 |
| S8 | Aspherical | 6.1243 | 2.2470 | | | | −0.9434 |
| S9 | Aspherical | 8.2182 | 1.4355 | 1.54 | 56.1 | −422.84 | −28.1984 |
| S10 | Aspherical | 7.4462 | 6.6141 | | | | −57.5174 |
| S11 | Spherical | Infinity | 0.2100 | 1.52 | 64.2 | | |
| S12 | Spherical | Infinity | 0.8844 | | | | |
| S13 | Spherical | Infinity | | | | | |

In Embodiment 8, both of the object-side surface and the image-side surface of any one of the first lens E1 to the fifth lens E5 are aspherical surfaces. Table 16 gives higher order term coefficients $A_4, A_6, A_8, A_{10}, A_{12}, A_{14}, A_{16}, A_{18}$ and $A_{20}$ that may be used for each of the aspherical mirror surfaces S1-S10 in Embodiment 8.

TABLE 16

| Surface number | A4 | A6 | A8 | A10 | A12 | A14 | A16 | A18 | A20 |
|---|---|---|---|---|---|---|---|---|---|
| S1 | 8.2407E−04 | −5.4606E−05 | 3.4598E−05 | −1.5776E−05 | 4.0260E−06 | −6.5288E−07 | 5.9699E−08 | −2.7417E−09 | 4.8969E−11 |
| S2 | 4.2847E−03 | −1.9428E−03 | 7.8257E−04 | −1.4717E−04 | 9.1949E−07 | 3.7537E−06 | −5.6565E−07 | 3.4308E−08 | −7.7240E−10 |
| S3 | −2.5418E−03 | −1.5832E−03 | 1.6719E−03 | −5.2509E−04 | 7.2650E−05 | −2.9945E−06 | −3.1794E−07 | 3.7754E−08 | −1.1110E−09 |
| S4 | −4.4935E−03 | −8.7902E−04 | 1.3197E−03 | −3.8064E−04 | 5.2712E−05 | −1.0857E−05 | 3.1608E−06 | −4.6850E−07 | 2.5118E−08 |
| S5 | 8.7510E−04 | −1.6170E−03 | −2.3018E−04 | 8.0709E−04 | −3.9109E−04 | 7.9194E−05 | −6.2271E−06 | −1.2930E−07 | 3.3278E−08 |
| S6 | 3.8757E−03 | −2.2096E−03 | −1.9512E−03 | 3.3153E−03 | −1.9091E−03 | 5.7127E−04 | −9.5908E−05 | 8.6022E−06 | −3.2151E−07 |
| S7 | −4.8420E−03 | 9.6295E−04 | −2.7460E−03 | 3.7841E−03 | −2.3141E−03 | 7.6722E−04 | −1.4444E−04 | 1.4630E−05 | −6.2297E−07 |

TABLE 16-continued

| Surface number | A4 | A6 | A8 | A10 | A12 | A14 | A16 | A18 | A20 |
|---|---|---|---|---|---|---|---|---|---|
| S8 | −8.8324E−03 | 3.3632E−03 | −1.5827E−03 | 1.3838E−03 | −8.3024E−04 | 2.9864E−04 | −6.2205E−05 | 6.9740E−06 | −3.2579E−07 |
| S9 | −5.4621E−03 | −7.0973E−04 | 1.8224E−04 | −1.3149E−05 | 2.6940E−06 | −3.3379E−06 | 1.0688E−06 | −1.2739E−07 | 4.5632E−09 |
| S10 | 7.2945E−03 | −8.1341E−03 | 4.4926E−03 | −1.9597E−03 | 6.2414E−04 | −1.3555E−04 | 1.8734E−05 | −1.4724E−06 | 4.9794E−08 |

Figure 16A:
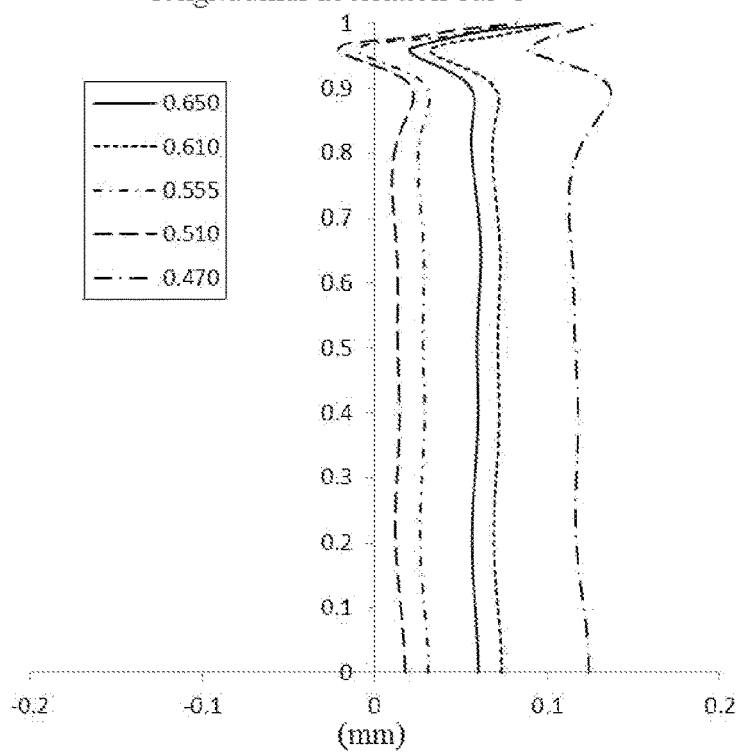
FIGS. 16A-16D show a longitudinal aberration curve, an astigmatism curve, a distortion curve and a lateral color curve of the optical imaging lens assembly in Embodiment 8 respectively.
Figure 16B:
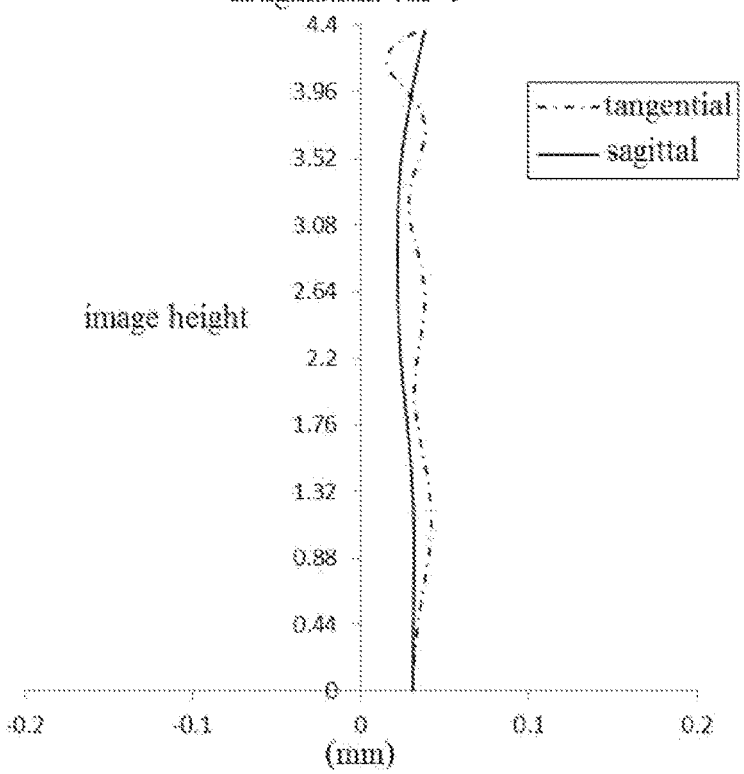
Figure 16C:
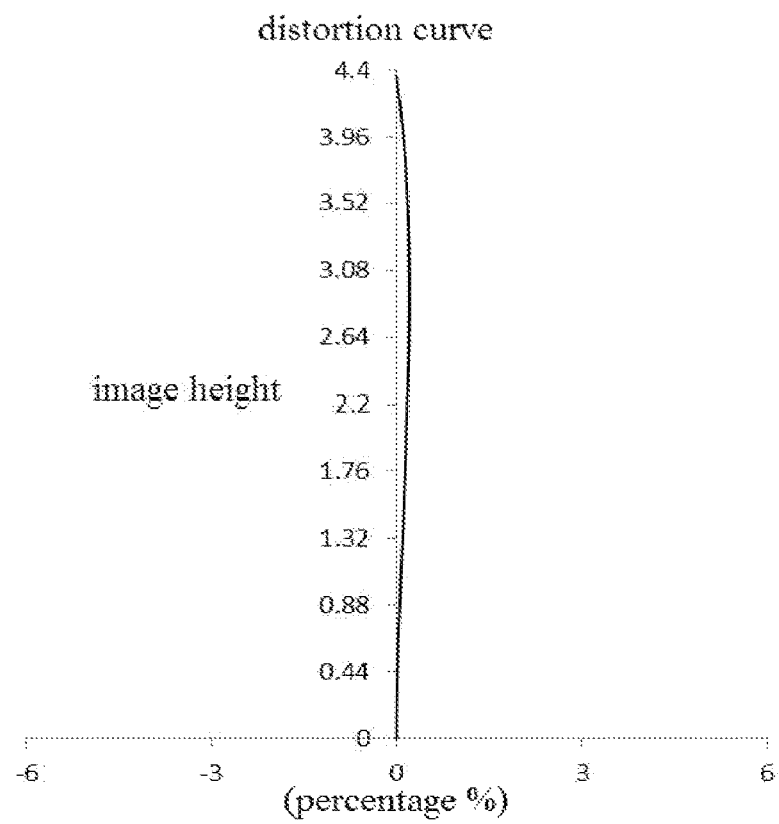
Figure 16D:
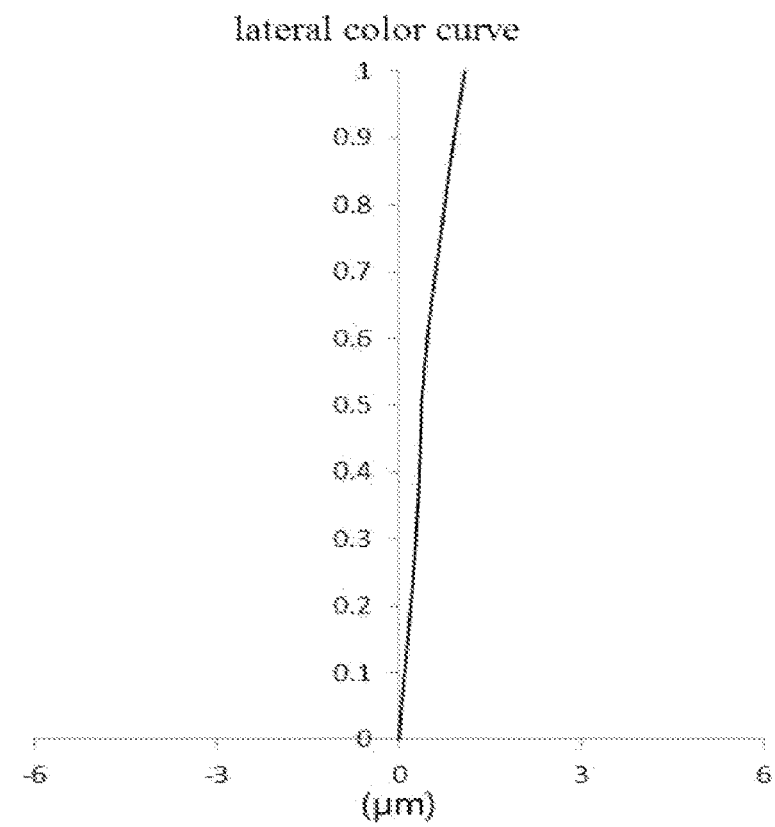

FIG. 16A shows a longitudinal aberration curve of the optical imaging lens assembly in Embodiment 8, which represents deviation of a convergence focal point after light with different wavelengths passes through the lens. FIG. 16B shows an astigmatism curve of the optical imaging lens of Embodiment 8, which represents a tangential image surface curvature and a sagittal image surface curvature. FIG. 16C shows a distortion curve of the optical imaging lens assembly of Embodiment 8, which represents distortion values corresponding to different image heights. FIG. 16D shows a lateral color curve of the optical imaging lens assembly in Embodiment 8, which represents deviation of different image heights on the imaging surface after the light passes through the lens. According to FIG. 16A to FIG. 16D, it can be seen that the optical imaging lens assembly provided in Embodiment 8 achieves good imaging quality.

To summarize, Embodiments 1-8 separately satisfy relationships shown in Table 17.

TABLE 17

| Conditional expression/embodiment | 1 | 2 | 3 | 4 | 5 | 6 | 7 | 8 |
|---|---|---|---|---|---|---|---|---|
| ImgH/(TTL/f) (mm) | 4.81 | 4.58 | 4.71 | 4.83 | 4.81 | 4.56 | 4.74 | 4.54 |
| TTL/f | 0.90 | 0.95 | 0.93 | 0.90 | 0.90 | 0.96 | 0.92 | 0.96 |
| (f3 − f1)/(f2 − f4) | 1.01 | 0.56 | 0.95 | 0.68 | 1.02 | 0.65 | 0.72 | 0.71 |
| (R7 − R8)/(R7 + R8) | 0.55 | 0.64 | 0.76 | 0.58 | 0.60 | 0.63 | 0.70 | 0.58 |
| (R2 − R1)/(R2 + R1) | 1.38 | 2.55 | 1.66 | 1.24 | 1.37 | 2.93 | 1.65 | 3.23 |
| f (mm) | 16.82 | 17.35 | 16.78 | 16.85 | 16.81 | 18.56 | 16.86 | 18.56 |
| FOV (°) | 28.7 | 28.3 | 29.1 | 28.6 | 28.7 | 26.5 | 28.9 | 26.5 |
| f × tan (FOV/2) (mm) | 4.30 | 4.37 | 4.35 | 4.30 | 4.30 | 4.37 | 4.35 | 4.37 |
| T45/T23 | 1.26 | 3.00 | 3.08 | 1.02 | 1.11 | 2.86 | 3.14 | 1.93 |
| DT11/DT51 | 1.21 | 1.13 | 1.15 | 1.22 | 1.22 | 1.22 | 1.16 | 1.29 |
| DT12/DT42 | 1.26 | 1.35 | 1.37 | 1.30 | 1.23 | 1.40 | 1.39 | 1.33 |
| TTL/BFL | 1.94 | 2.17 | 2.31 | 2.09 | 1.94 | 2.30 | 2.31 | 2.31 |
| f12/f34 | 0.16 | 1.54 | 0.53 | 0.86 | 0.29 | 1.24 | 0.65 | 0.80 |

The above description is only description about the embodiments of the disclosure and adopted technical principles. Those skilled in the art should know that the scope of present disclosure involved in the disclosure is not limited to the technical solutions formed by specifically combining the technical features and should also cover other technical solutions formed by freely combining the technical features or equivalent features thereof without departing from the inventive concept, for example, technical solutions formed by mutually replacing the features and (but not limited to) the technical features with similar functions disclosed in the disclosure.

What claimed is:

1. An optical imaging lens assembly, sequentially comprising from an object side to an image side along an optical axis:
   a first lens having a positive refractive power;
   a second lens having a negative refractive power;
   a third lens having a positive refractive power;
   a fourth lens having a negative refractive power, and an image-side surface of the fourth lens being a concave surface; and
   a fifth lens having a refractive power; and
   wherein ImgH, half of a diagonal length of an effective pixel region on an imaging surface of the optical imaging lens assembly, TTL, a distance from an object-side surface of the first lens to an imaging surface along the optical axis, and f, a total effective focal length of the optical imaging lens assembly satisfy:

$ImgH/(TTL/f) > 4.5$ mm;

wherein TTL, the distance from the object-side surface of the first lens to the imaging surface along the optical axis and f, the total effective focal length of the optical imaging lens assembly satisfy:

$0.8 < TTL/f < 1.0$.

2. The optical imaging lens assembly according to claim 1, wherein f1, an effective focal length of the first lens, f2, an effective focal length of the second lens, f3, an effective focal length of the third lens and f4, an effective focal length of the fourth lens satisfy:

$0.5 < (f3-f1)/(f2-f4) < 1.2$.

3. The optical imaging lens assembly according to claim 1, wherein R7, a radius of curvature of an object-side surface of the fourth lens and R8, a radius of curvature of an image-side surface of the fourth lens satisfy:

$0.4 < (R7-R8)/(R7+R8) < 0.9$.

4. The optical imaging lens assembly according to claim 1, wherein R1, a radius of curvature of the object-side surface of the first lens and R2, a radius of curvature of an image-side surface of the first lens satisfy:

$1.2 < (R2-R1)/(R2+R1) < 3.3$.

5. The optical imaging lens assembly according to claim 1, wherein f, the total effective focal length of the optical imaging lens assembly satisfies:

$15$ mm $< f < 20$ mm.

6. The optical imaging lens assembly according to claim 1, wherein FOV, a maximum field of view of the optical imaging lens assembly satisfies:

25°<FOV<30°.

7. The optical imaging lens assembly according to claim 1, wherein f, the total effective focal length of the optical imaging lens assembly and FOV, a maximum field of view of the optical imaging lens assembly satisfy:

f×tan(FOV/2)<5.0 mm.

8. The optical imaging lens assembly according to claim 1, wherein T23, an air gap between the second lens and the third lens on the optical axis and T45, an air gap between the fourth lens and the fifth lens on the optical axis satisfy:

1.0<T45/T23<3.2.

9. The optical imaging lens assembly according to claim 1, wherein DT11, a maximum effective radius of an object-side surface of the first lens and DT51, a maximum effective radius of an object-side surface of the fifth lens satisfy: 1.1<DT11/DT51<1.4.

10. The optical imaging lens assembly according to claim 1, wherein DT12, a maximum effective radius of an image-side surface of the first lens and DT42, a maximum effective radius of an image-side surface of the fourth lens satisfy: 1.2<DT12/DT42<1.5.

11. The optical imaging lens assembly according to claim 1, wherein TTL, a distance from an object-side surface of the first lens to the imaging surface on the optical axis and BFL, a distance from an image-side surface of the fifth lens to the imaging surface on the optical axis satisfy: 1.9<TTL/BFL<2.4.

12. The optical imaging lens assembly according to claim 1, wherein f12, a combined focal length of the first lens and the second lens and f34, a combined focal length of the third lens and the fourth lens satisfy: 0.1<f12/f34<1.6.

13. An optical imaging lens assembly, sequentially comprising from an object side to an image side along an optical axis:
   a first lens having a positive refractive power;
   a second lens having a negative refractive power;
   a third lens having a positive refractive power;
   a fourth lens having a negative refractive power, and an image-side surface of the fourth lens being a concave surface; and
   a fifth lens having a refractive power; and
   wherein f, a total effective focal length of the optical imaging lens assembly satisfies:

15 mm≤f<20 mm;

wherein TTL, a distance from an object-side surface of the first lens to an imaging surface on the optical axis and f, the total effective focal length of the optical imaging lens assembly satisfy: 0.8<TTL/f<1.0.

14. The optical imaging lens assembly according to claim 13, wherein f1, an effective focal length of the first lens, f2, an effective focal length of the second lens, f3, an effective focal length of the third lens and f4, an effective focal length of the fourth lens satisfy:

0.5<(f3−f1)/(f2−f4)<1.2.

15. The optical imaging lens assembly according to claim 13, wherein R7, a radius of curvature of an object-side surface of the fourth lens and R8, a radius of curvature of an image-side surface of the fourth lens satisfy: 0.4<(R7−R8)/(R7+R8)<0.9.

16. The optical imaging lens assembly according to claim 13, wherein R1, a radius of curvature of an object-side surface of the first lens and R2, a radius of curvature of an image-side surface of the first lens satisfy: 1.2<(R2−R1)/(R2+R1)<3.3.

17. The optical imaging lens assembly according to claim 16, wherein ImgH, half of a diagonal length of an effective pixel region on an imaging surface of the optical imaging lens assembly, TTL, a distance from an object-side surface of the first lens to an imaging surface on the optical axis, and f, the total effective focal length of the optical imaging lens assembly satisfy:

ImgH/(TTL/f)>4.5 mm.

18. The optical imaging lens assembly according to claim 13, wherein FOV, a maximum field of view of the optical imaging lens assembly satisfies: 25°<FOV<30°.

* * * * *